(12) United States Patent
Miyatani et al.

(10) Patent No.: US 7,561,629 B2
(45) Date of Patent: Jul. 14, 2009

(54) MULTICARRIER RECEIVER AND TRANSMITTER WITH DELAY CORRECTING FUNCTION

(75) Inventors: Tetsuhiko Miyatani, Tokyo (JP); Takashi Okada, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 603 days.

(21) Appl. No.: 11/250,951

(22) Filed: Oct. 14, 2005

(65) Prior Publication Data

US 2006/0088125 A1 Apr. 27, 2006

(30) Foreign Application Priority Data

Oct. 21, 2004 (JP) ............................. 2004-306690
Mar. 30, 2005 (JP) ............................. 2005-098806

(51) Int. Cl.
H04K 1/10 (2006.01)

(52) U.S. Cl. ..................... 375/260; 375/259; 375/297; 375/296; 375/295; 330/149; 455/501

(58) Field of Classification Search ................ 375/260, 375/259, 297, 296, 295, 316; 330/149; 455/501
See application file for complete search history.

(56) References Cited

U.S. PATENT DOCUMENTS 5,812,608 A * 9/1998 Valimaki et al. ............ 375/331

6,856,655 B1 2/2005 Garcia

FOREIGN PATENT DOCUMENTS

| JP | 10-200500 | 7/1998 |
| JP | 11-122311 | 4/1999 |
| JP | 2001-217892 | 8/2001 |

* cited by examiner

*Primary Examiner*—David C Payne
*Assistant Examiner*—Zewdu Kassa
(74) *Attorney, Agent, or Firm*—Crowell & Moring LLP

(57) ABSTRACT

A multicarrier receiver that receives N carrier frequencies therein comprises N A/D converters each of which analog-digital converts a receive signal at a sample rate fs for each carrier, N quadrature detectors which receive outputs sent from the N A/D converters therein and digitally quadrature-detect the outputs, respectively, 2N LPFs which allow only desire bands of outputs of the N quadrature detectors to pass therethrough, and N delay time correcting means each of which corrects a processing delay time deviation for each carrier inside the multicarrier receiver in a time unit of less than 1/fs using a fractional delay filter. The delay time correcting means has, for example, an M-stage shift register which operates at fs and generates a delay of M/fs, and a fractional delay filter which operates at fs and includes an even number of tap coefficients and which generates a delay different from M/fs by 0.5/fs.

1 Claim, 16 Drawing Sheets

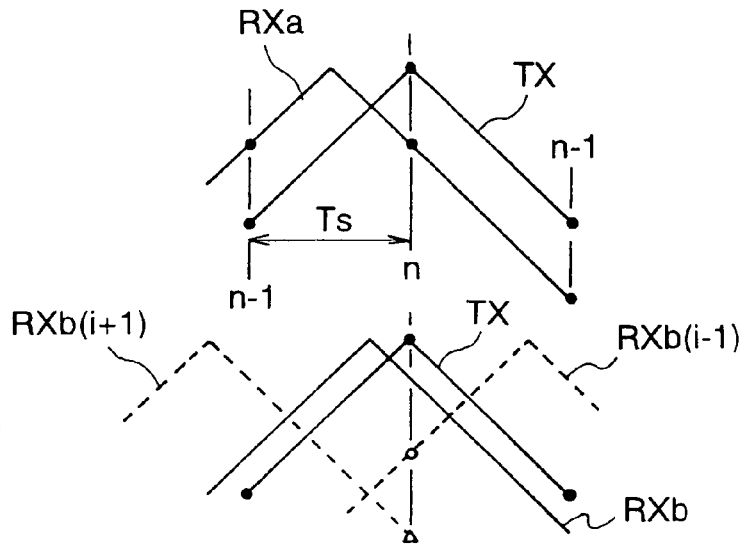
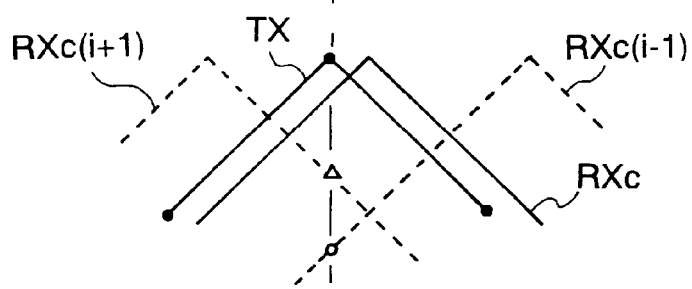
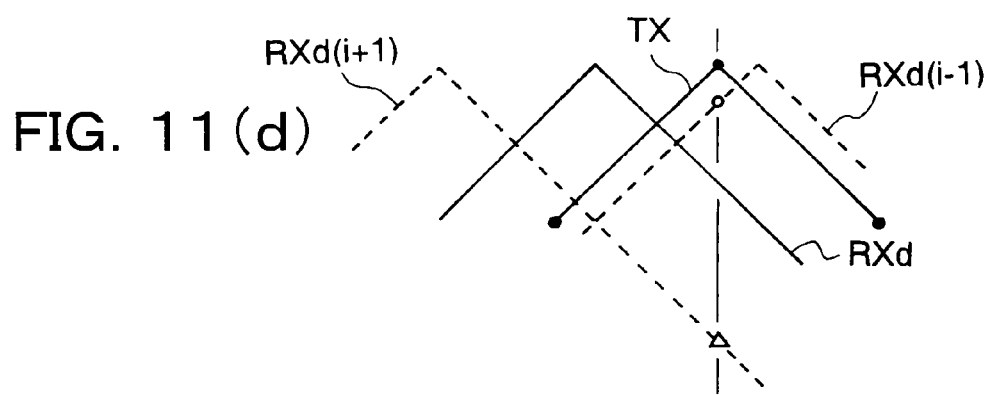

POWER WAVEFORMS OF TRANSMIT SIGNAL AND
PRE-DELAY CORRECTION FEEDBACK SIGNAL

POWER WAVEFORMS OF TRANSMIT SIGNAL AND
POST-DELAY CORRECTION FEEDBACK SIGNAL

MULTICARRIER RECEIVER AND TRANSMITTER WITH DELAY CORRECTING FUNCTION

BACKGROUND OF THE INVENTION

1. Field of the Invention:

The present invention relates to a multicarrier receiver and a transmitter with a delay correcting function, and particularly to a multicarrier receiver which suppresses a deviation in delay time for each carrier at a receiving section upon dealing with a multicarrier, and a transmitter with a delay correcting function which corrects a delay between transmission and feedback for a distortion analysis.

2. Description of the Related Art:

FIG. 15 is a configuration diagram showing one example of a conventional multicarrier receiver.

In the same drawing, reference numeral 101 indicates a DUPlexer (DUP) which has a filter whose one end is connected to an antenna (not shown) capable of transmitting and receiving a multicarrier and which separates a transmit signal to the antenna and a receive signal from the antenna, using the difference between frequencies for transmission and reception.

Reference numeral 102 indicates a low noise amplifier which amplifies a receive signal to a desired level.

Reference numeral 103 indicates a BPF (Band Pass Filter) which extracts only a band necessary for reception.

Reference numerals 104 through 108 correspond to each of receivers, which is used for a given specific carrier frequency. It is hereinafter called "single carrier receiver 109". The single carrier receivers 109 are provided by the number of carriers to be received, and the output of the BPF 103 is distributed and inputted thereto.

Reference numeral 104 indicates a mixer which performs frequency conversion from a radio frequency band to an intermediate frequency allowed to pass by a narrow-band BPF 105.

Reference numeral 105 indicates the narrow-band BPF. In the present example, a SAW (Surface Acoustic Wave) filter is assumed to be used as the narrow-band BPF. It is common that the SAW filters are constructed in two stages in cascade form to obtain attenuation in terms of application to radio equipment. Therefore, a two-stage configuration is adopted.

Reference numeral 106 indicates an A/D converter which converts an analog signal to a digital signal.

Reference numeral 107 indicates a quadrature detector, which digitally quadrature-detects an intermediate frequency signal to a baseband I/Q signal.

Reference numeral 108 indicates an LPF which deletes a double frequency component generated at the quadrature detector 107 and performs a band restriction.

As another related art associated with the present invention, there is known one wherein a fractional delay filter for realizing a slight delay is applied to wireless communication equipment (refer to, for example, a patent document 1 (Japanese Patent Laid-Open No. 2001/217892)).

FIG. 16 is a block diagram showing a configuration of a transmitter of a conventional base station apparatus employed in a mobile communication system such as a W-CDMA (Wideband-Code Division Multiple Access) system or the like.

In the same drawing, each input baseband signal is supplied to a digital modulator 1001, where processes such as band restrictions made every I and Q phases of the baseband signal, upconversion to an IF (Intermediate Frequency) and digital quadrature modulation are carried out. A D/A (Digital/Analog) converter 1002 converts the baseband signal into analog I and Q phases. These I and Q phases are supplied to a frequency converter 1003 where they are quadrature-modulated and upconverted into an RF (Radio Frequency) signal. A signal outputted from the frequency converter 1003 is power-amplified by a power amplifier 1004, which in turn is transmitted from an unillustrated antenna.

FIG. 17 is a configuration diagram showing one example of the digital modulator 1001 shown in FIG. 16.

Let's assume that I components of N (where N: integer greater than or equal to 2) baseband signals are inputted to the digital modulator 1001 in the same figure. In this case, the digital modulator 1001 is provided with N band restriction filters 1001a, 1001b, . . . , 1001c, N upfilters 101d, 1001e, . . . , 1001f, and N digital quadrature modulation sections 1001g, 1001h, . . . , 1001i. A frequency band for an I component of a baseband signal $f_1$ is restricted to a predetermined form at the band restriction filter 1001a. A sampling frequency (sample rate) is upconverted by the upfilter 1001d and digitally quadrature-modulated by the digital quadrature modulation section 1001g, whereby a quadrature-modulated IF signal is obtained in which the sample rate is 92.16 MHz, for example. Similarly, frequency bands for respective I components of baseband signals $f_2$, . . . , $f_N$ are also restricted to predetermined forms at the band restriction filters 1001b, . . . , 1001c respectively. Sampling frequencies (sample rates) are upconverted by the upfilters 1001e, . . . , 1001f and digitally quadrature-modulated by the digital quadrature modulation sections 1001h, . . . , 1001i respectively, whereby quadrature-modulated IF digital signals are obtained in which the sample rates are 92.16 MHz, for example.

The thus-obtained quadrature-modulated IF digital signals of N I components are added together by an adder 1001j. Consequently, an IF signal is obtained in which the I components of the respective baseband signals $f_1$ to $f_N$ are combined together by quadrature modulation. The IF composite signal of I components is supplied to the D/A converter 1002 shown in FIG. 16.

Similarly, Q components of the baseband signals $f_1$ to $f_N$ are also subjected to similar processing, so that an IF composite signal of Q components in which the Q components are combined together by quadrature modulation, is obtained from the digital modulator 1001, after which it is supplied to the D/A converter 1002 shown in FIG. 16.

In FIG. 16, the IF composite signal of I components and the IF composite signal of Q components both outputted from the digital modulator 1001 are respectively converted to analog IF composite signals by the D/A converter 1002. The IF composite signal of I components and the IF composite signal of Q components are combined together by quadrature modulation at the frequency converter 1003 to result in an RF signal for one channel.

Realizing one multicarrier receiver by unifying the plurality of single carrier receivers 109 as described above mainly results from the restrictions of the dynamic range and sampling frequency of the A/D converter 106. This is of an extremely general receiver configuration. There has heretofore been no problem under such a configuration. However, it has recently been found out that a deviation in delay time presents a problem upon the process of bringing into multicarrier form, that is, the process of consolidating plural carriers subjected to reception processing into one again and transmitting the same to a baseband signal processor through an interface between the receiving section and the baseband signal processor (block located in a stage subsequent to the single carrier receiver 109).

In a receiver that performs a multicarrier communication as in a multicarrier mode in a CDMA 2000 system, a baseband signal processor normally operates with the times required to propagate respective carriers as being equal to each other. That is, it does not grasp a deviation in delay time for each carrier. Assuming that this presumption is not made and the deviation in delay time varies, the baseband signal processor must always grasp, by use of a DLL or the like, the deviation in delay time between the carriers at an arbitrary channel at which the multicarrier communication is being performed, and perform such complex processing as to correct the deviation in delay time for each carrier. Even upon execution of such processing, the interface to the baseband signal processor is normally implemented at a sampling frequency which is as slow in speed as possible, for the purpose of reductions in cost and size. Time resolution is not sufficient at the reduced sampling frequency. Since the sampling frequency is returned to a high sampling frequency by complex signal processing (interpolation or the like) and thereafter correction is made, the configuration of the interface is made inefficient. Therefore, the deviation in delay time on the multicarrier receiver side is prescribed so as to fall within a predetermined range.

In general, however, analog parts always have delay deviations due to individual variations in parts and a change in temperature. In particular, the filter parts like the DUP 101, BPF 103 and narrow-band BPF 105 are large in delay and increase in deviation too. Deviations in delay time of devices employed in the CDMA 2000 receiver will be explained by way of example. In the DUP 101, its deviation results in ±50 nsec, and in the SAW filters of the narrow-band BPF 105, their deviations result in +60 nsec/−50 nsec (upon two-stage configuration) respectively. The worst supposed delay deviation results in +110 nsec/−100 nsec. There is a possibility that this will exceed a prescribed value (±102 nsec @cdma2000) of the interface global standard for a transmission amplifying device with a transmitting/receiving function, which is referred to as "CPRI (Common Public Radio Interface)".

Thus, the related art has adapted to the reduction in delay deviation produced for each carrier by increasing each analog constituent part in cost and size in order to reduce the delay deviation. When an attempt is made to greatly ensure the amount of out-of-band attenuation in the neighborhood of a desired band in each SAW filter, for example, a delay deviation increases too. Therefore, an attempt has been made to relax the amount of out-of-band attenuation per SAW filter and instead increase the number of multistage connections. In the present method, however, the gain is lost by about 10 dB each time the number of SAW filter stages increases by 1, so that amplifiers are also additionally provided. Thus, solid variations in all these parts, their changes in temperature, etc. must be managed, and adaptation to mass-production becomes difficult due to an increase in the number of parts.

SUMMARY OF THE INVENTION

The present invention has been made in view of the above background. An object of the present invention is to provide a multicarrier receiver which suppresses a delay time deviation in a receiving section for each carrier without increasing the configuration of each analog section in cost and size.

In the transmitting section shown in FIG. 16, the power amplifier 1004 generates distortion in the RF signal power-amplified thereby. Therefore, there is a need to feed back and analyze the output of the power amplifier 1004 and correct the distortion on the basis of the result of analysis.

Thus, it is considered that as shown in FIG. 16, some of the output signal of the power amplifier 1004 are supplied to a mixer 1005, where they are downconverted into analog IF signals, then the analog IF signals are converted into digital signals by an A/D converter 1006 and quadrature-detected by a digital quadrature detector 1007 to thereby obtain an IF composite signal of I and Q phases outputted from the digital modulator 1001, and the IF composite signal of these I and Q phases is set as feedback signals and compared with the IF composite signal of I and Q phases used as the transmit signals outputted from the digital modulator 1001, thereby detecting distortion generated by the power amplifier 1004 and correcting the transmit signals of I and Q phases outputted from the digital modulator 1001 so as to cancel the distortion generated in the power amplifier 1004 according to the result of detection.

However, the so-obtained feedback signals of I and Q phases are delayed due to processing times of the D/A converter 1002, frequency converter 1003, power amplifier 1004, mixer 1005, A/D converter 1006 and digital quadrature detector 1007. Therefore, a shift in timing occurs in the transmit signals of I and Q phases outputted from the digital modulator 1001. It is thus difficult to analyze the distortion of the power amplifier 1004.

Thus, the amount of delay of the feedback signals of I and Q phases with respect to the transmit signals of I and Q phases is detected. A shift in timing between each of the transmit signals of I and Q phases and each of the feedback signals of I and Q phases is corrected according to the detected amount of delay. It is thus possible to analyze the distortion of the power amplifier 1004. If the amount of delay between the transmit signals and feedback signals of I and Q phases is detected with an accuracy of one sample in this case, then the response of an impulse signal is analyzed with the impulse signal as an input baseband signal (or IF composite signal). Alternatively, a normal modulated wave (IF composite signal) is used as transmit signals and the correlation between the transmit signals and the feedback signals is taken, whereby the detection of delay is made possible. When, however, the delay is detected with the accuracy of one sample in this way to correct the amount of delay, high-precision delay correction cannot be performed. Even though delay compensation is made with such an accuracy, and the transmit signals of I and Q phases and the feedback signals thereof are compared with each other to detect the distortion generated by the power amplifier 1004, such distortion cannot be detected with satisfactory accuracy, so that high-precision distortion correction cannot be carried out.

Another object of the present invention is to provide a transmitter with a delay correcting function, which solves such a problem and is capable of detecting the amount of delay between each of transmit signals and each of feedback signals with a high degree of precision and correcting a shift in timing between the transmit signal and the feedback signal with a high degree of precision. In order to attain the above objects, the present invention provides a multicarrier receiver that receives N (where N: integer greater than or equal to 1) carrier frequencies therein, comprising N A/D converters each of which analog-digital converts a receive signal at a sample rate fs (e.g., 8/Tc) for each carrier, and 1 through N delay correcting means which correct respective delay times of the carriers in time units smaller than 1/fs (e.g., Tc/8) according to digital signal processing.

Also the present invention provides a multicarrier receiver that performs a wireless communication including N (where N: integer greater than or equal to 1) carrier frequencies, comprising N A/D converters each of which analog-digital converts a receive signal at a sample rate fs for each carrier, N quadrature detectors which receive outputs sent from the N A/D converters therein and digitally quadrature-detect the outputs, respectively, 2N filters which allow only low frequencies of outputs of the N quadrature detectors to pass therethrough, and N delay time correcting means each provided between the A/D converter and the quadrature detector for each carrier, or between the quadrature detector and the filter, or in a stage subsequent to the filter, or inside the filter, each of the delay time correcting means correcting a processing delay time deviation for each carrier inside the multicarrier receiver in a time unit of ½ fs or less using a fractional delay filter.

Each of the delay time correcting means in the multicarrier receiver includes a shift register which operates at a sample rate fs and generates a delay of M/fs (where M: integer greater than 0), a fractional delay filter which has an even number of tap coefficients and which operates at the sample rate fs and generates a delay different from M/fs by 0.5/fs, and a selection circuit which selects the outputs of the shift register and the fractional delay filter and outputs the selected output therefrom.

In order to attain the above objects, the present invention provides a transmitter with a delay correcting function, including a digital modulator which digital-modulates a plurality of input baseband signals and outputs signals of I and Q phases, a D/A converter which converts the signals of I and Q phases outputted from the digital modulator to analog signals, a frequency converter which quadrature-modulates the analog signals of I and Q phases outputted from the D/A converter and upconverts the same into signals lying in an RF band, and a power amplifier which power-amplifies output signals of the frequency converter, the transmitter performing transmission of plural channels, the transmitter comprising a mixer which downconverts the output signals of the power amplifier, an A/D converter which converts the output signals of the mixer into digital signals, a digital quadrature detector which quadrature-detects the output signals of the A/D converter to output signals of I and Q phases, a delay detector which supplies the signals of I and Q phases outputted from the digital modulator as transmit signals and supplies the signals of I and Q phases outputted from the digital quadrature detector as feedback signals, respectively, and which detects, as shifts in timing between the transmit signals and the feedback signals, a coarse delay amount with an accuracy of a sample time unit for each of the transmit signals and feedback signals and a slight delay amount with an accuracy of a time unit shorter than the sample time unit for each of them, and a delay corrector which corrects shifts in timing between the transmit signals and the feedback signals on the basis of the coarse delay amount and the slight delay amount detected by the delay detector.

According to the multicarrier receiver according to the present invention, the accuracy of a request for a delay deviation with respect to each analog part can be reduced. It is therefore possible to bring the analog part into less cost and size.

According to the transmitter according to the present invention, the use of a delay detector and a delay corrector makes it possible to perform matching in timing between each of transmit signals and each of feedback signals originally shifted in timing, with a high degree of precision. A distortion compensation algorithm for performing comparisons every samples between the transmit signals and the feedback signals.

Other features and advantages of the present invention will become apparent upon a reading of the attached specification.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 11 is a diagram schematically showing the principle of a slight delay detecting process at the delay detector shown in FIG. 8;

FIG. 16 is a block diagram illustrating a configuration of a transmitter of a conventional base station apparatus employed in a mobile communication system such as a W-CDMA system or the like.

DETAILED DESCRIPTION OF THE PREFERRED EMBODIMENTS

Preferred embodiments of the present invention will be explained hereinafter with reference to the accompanying drawings.

First Preferred Embodiment

Figure 1:
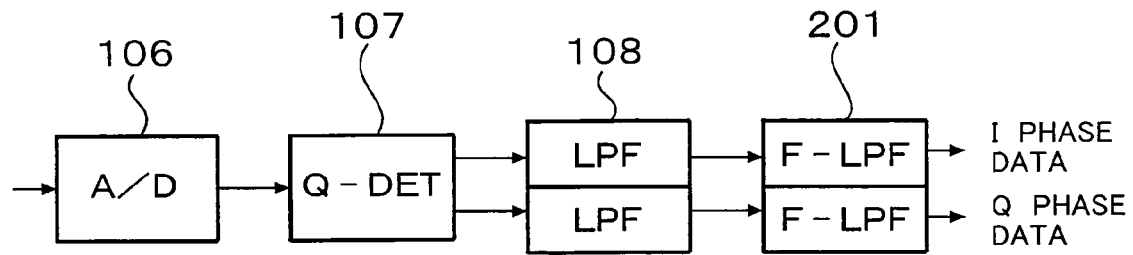
FIG. 1 is a configuration diagram showing an essential part of a first embodiment of a multicarrier receiver according to the present invention.
Figure 15:
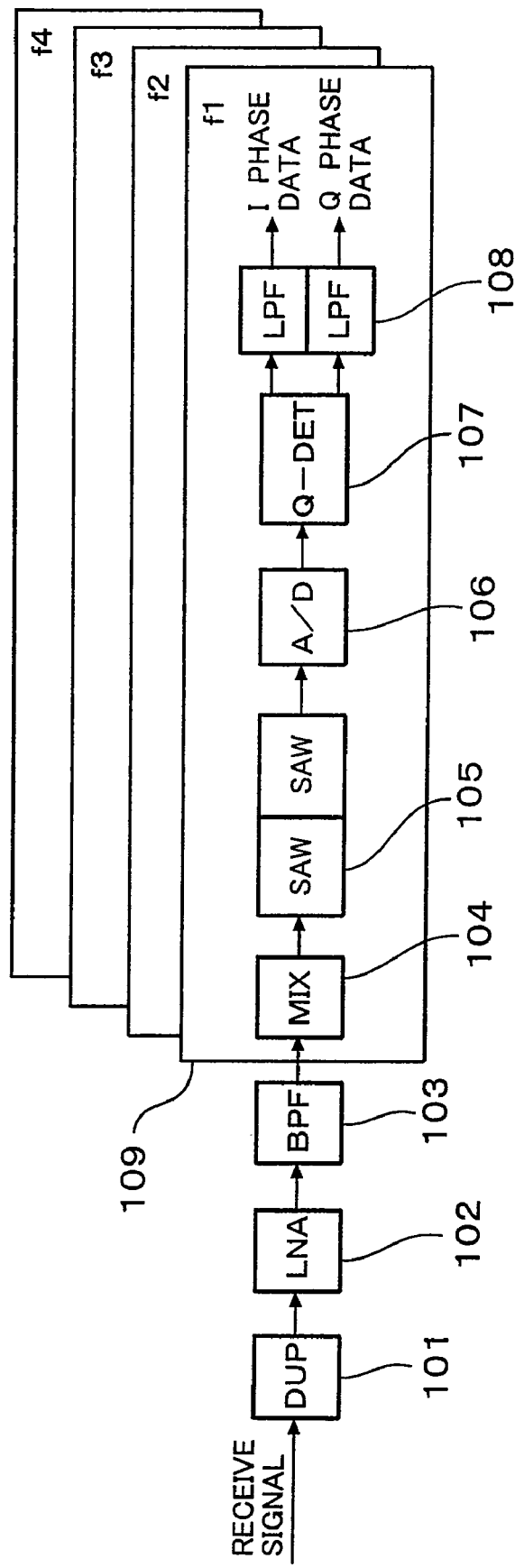
FIG. 15 is a configuration diagram showing one example of a conventional multicarrier receiver.

FIG. 1 is a configuration diagram showing an essential part of a first embodiment of a multicarrier receiver according to the present invention and shows only constituent portions different from FIG. 15 and their peripheries. Reference numeral 201 indicates an F-LPF (Fractional Low Pass Filter). Constituent portions corresponding to those shown in FIG. 15 are given the same reference numerals respectively, and dual explanations thereof are omitted.

In the same drawing, the first embodiment includes the F-LPF 201 provided in a stage subsequent to an LPF 108 under the configuration shown in FIG. 15. Incidentally, it is also possible to combine the LPF 108 and the F-LPF 201 together and allow the LPF 108 to share the role of the F-LPF 201. However, these functions are illustrated in parts to make easy understanding. Any HPF, LPF and BPF may be adopted as the F-LPF 201 if their functions are satisfied.

Second Preferred Embodiment

Figure 2:
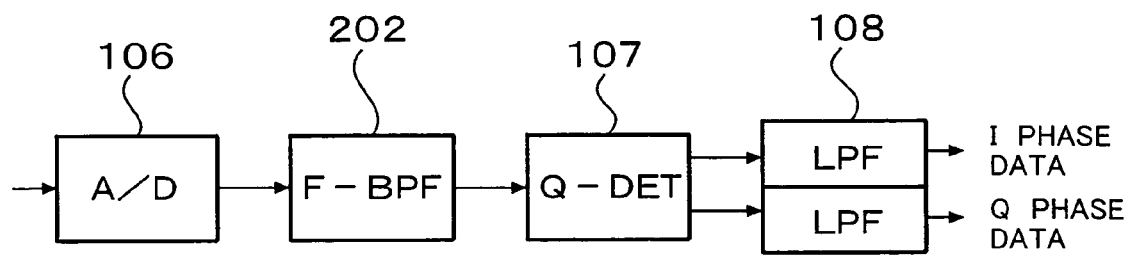
FIG. 2 is a configuration diagram showing an essential part of a second embodiment of a multicarrier receiver according to the present invention.

FIG. 2 is a configuration diagram showing an essential part of a second embodiment of a multicarrier receiver according to the present invention and illustrates only constituent portions different from FIG. 15 and their peripheries. Reference numeral 202 indicates an F-BPF (Fractional Band Pass Filter). Constituent portions corresponding to those shown in FIG. 15 are given the same reference numerals respectively, and dual explanations thereof are omitted.

In the same drawing, the second embodiment includes the F-BPF 202 provided between an A/D converter 106 and a quadrature detector 107 under the configuration shown in FIG. 15. Incidentally, any of HPF, LPF and BPF may be used as the F-BPF 202 if their functions are satisfied.

The principle of delay correction by filters will be explained below using FIG. 3.

Figure 3:
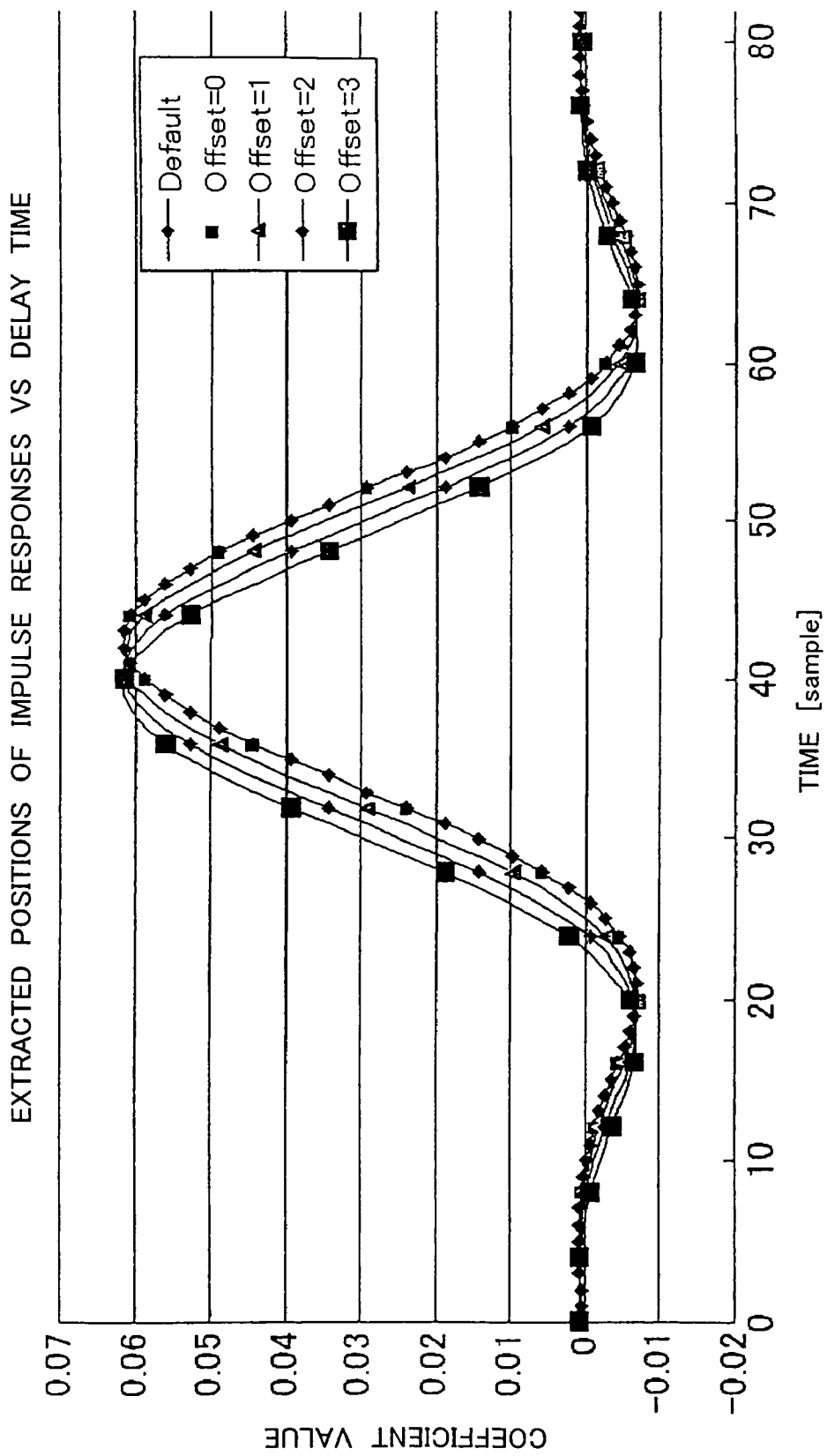
FIG. 3 is a diagram for describing the principle of delay correction by filters shown in FIGS. 1 and 2.

FIG. 3 shows impulse responses designed for a given LPF, which are extracted every 4 samples from positions where they are shifted by 0 to 4 samples. That is, one described as Default in the drawing corresponds to the original impulse response that consists of 86 coefficients. The impulse responses are ones obtained by extracting 21 coefficients corresponding to times of 4×T+offsets (where T=0, 1, 2, . . . , 21) from the 86 coefficients. As apparent from lines obtained by smoothly connecting the extracted points, it is understood that delay times change with the offsets. In exactly the same manner as when the filter is configured of BPF, coefficients of Default are determined by one pair, and units at which necessary time resolutions are obtained therefrom, i.e., coefficients are extracted in four units as described in the example of the LPF referred to above. When the F-LPF 201, F-BPF 202, etc. are so-called transversal type FIR (Finite Impulse Response) filters, the extracted impulse responses may be set to tap coefficients as they are.

It is thus possible to perform desired delay deviation correction in a desired resolution for each carrier.

Third Preferred Embodiment

Figure 4:
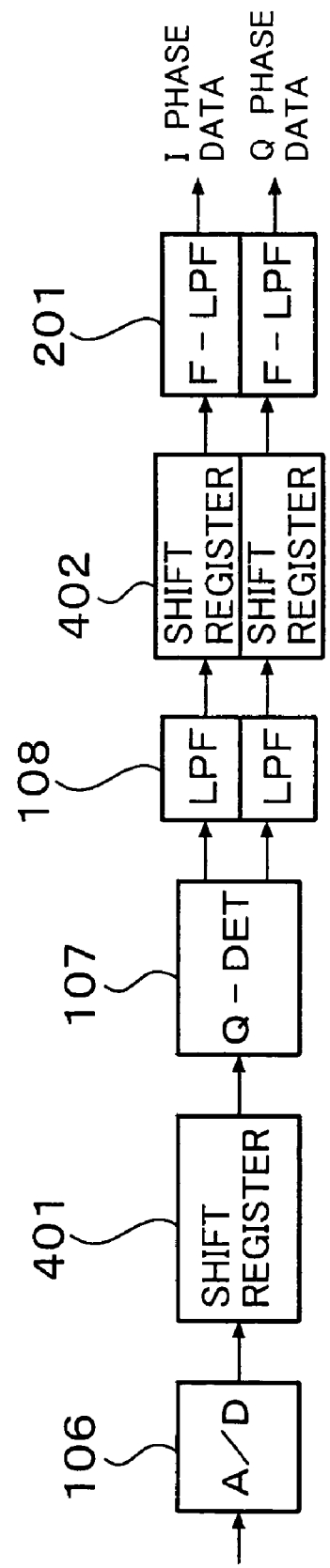
FIG. 4 is a configuration diagram illustrating an essential part of a third embodiment of a multicarrier receiver according to the present invention.

FIG. 4 is a configuration diagram showing an essential part of a third embodiment of a multicarrier receiver according to the present invention, which is suitable for use in an RRU (Remote Radio Unit, which is also called forward base station or extension base station) in a CDMA cellular phone infrastructure. Reference numerals 401 and 402 are shift registers respectively. Constituent portions corresponding to those shown in FIGS. 15 and 1 are given the same reference numerals respectively.

In the same drawing, the third embodiment includes the shift register 401 provided between the A/D converter 106 and the quadrature detector 107, and the shift register 402 provided between the LPF 108 and F-LPF 201 for I and Q phases under the configurations shown in FIGS. 15 and 1. Incidentally, a section prior to the A/D converter 106 is identical to the configuration shown in FIG. 15. Thus, the third embodiment is different from the first embodiment in that the shift registers 401 and 402 are provided.

The shift register 401 is of a number-of-stages variable shift register, which operates at a frequency of 8/Tc (where Tc: tip time of an original signal source, or symbol time) corresponding to a sample rate of the A/D converter 106 and adjusts delay times in units of Tc/8.

The shift register 402 is of a number-of-stages variable shift register, which operates at a frequency of 2/Tc corresponding to an output rate of the LPF 108 and adjusts delay times in units of Tc/2. As will be described later, either one of the shift registers 401 and 402 may be provided or they are utilized in combination.

The F-LPF 201 is a digital filter capable of resetting each tap coefficient and adjusts such a small or slight delay time that both the shift register 401 and the shift register 402 cannot adjust. A method for setting tap coefficients that compensate for the slight delay time is similar to FIG. 3.

The reason why the two shift registers are provided in FIG. 4 is that since a sampling frequency is generally reduced as subsequent blocks are reached, time resolution per one-stage shifter is reduced. Let's assume that for example, a specified value based on CPRI±102 nsec@cdma2000 is equivalent to Tc/8, and one having a time resolution of Tc/8 is used as the A/D converter 106 to carry out the delay correction by digital processing. Thus, when the A/D converter 8 is operated with 8× over sampling, the shift register 401 that fetches an output signal of the A/D converter 106 is capable of shifting a delay time with an accuracy of Tc/8. Thereafter, the output of the shift register 401 is multiplied by quadrature local signals (e.g., 1, 0, –1, 0, . . . and 0, 1, 0, –1, . . . ) at the quadrature detector 107. The LPF 108 is of, for example, a polyphased decimation filter whose frequency characteristic is of an LPF characteristic which performs image removal and a desired band restriction. When the LPF 108 is implemented for cdma2000 as a so-called matched filter in the sense that an S/N ratio is made greatest, its 3-dB bandwidth results in one-half (0.6144 MHz) the bandwidth corresponding to one carrier. Down sampling is carried out by the LPF 108 and hence the time resolution is reduced to Tc/2 corresponding to an interface rate. As a result, the time resolution of the shift register 402 reaches Tc/2.

Since the shift register 401 is high in accuracy, all can be implemented by the shift register 401. When, however, a shift amount is large, e.g., a shift of (11/8)Tc is required, the shift register 401 is caused to perform three sample shifts, and the remaining amount of delay is achieved by four sample shifts of the shift register 402, thus bringing about the merit that the number of stages of the respective shift registers is less reduced. It is normally desirable that all are implemented by the shift register 401.

Incidentally, there may be cases in which a deviation in delay amount becomes not only + but also –. If, for example, the shift register 401 is of shift registers of ten stages in such a case, then the output of the fifth stage is associated with the state of default (i.e., delay amount 0) and may be adapted to both of minus/plus.

The delay amount correction implementable by the shift registers of the third embodiment depends upon an operation clock strictly and is made in one-clock time unit. This is because all blocks shown in FIG. 4 are in sync with the edge (rising edge or falling edge) of a common clock (8/Tc), and a change in the phase of the clock in the shift register 401 alone serves no purpose even if it is done. If it is necessary to perform delay amount correction corresponding to one clock time or less, then the delay amount correction is carried out by the F-LPF 201 or the like.

Fourth Preferred Embodiment

Figure 5:
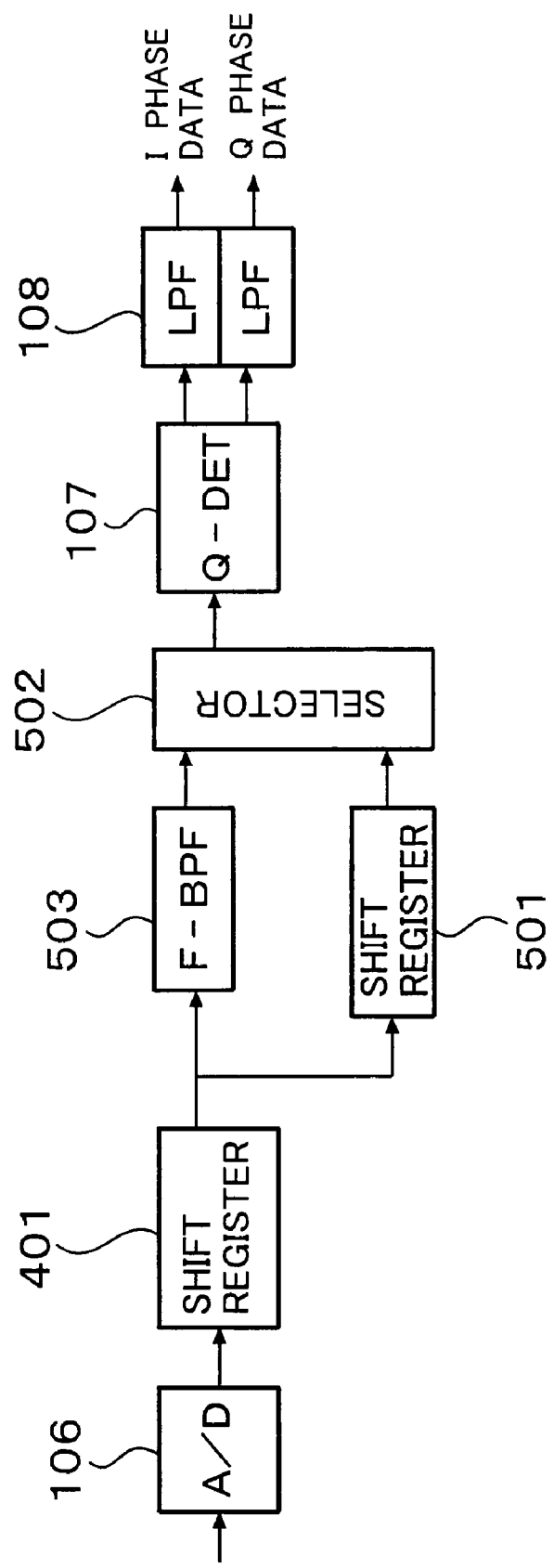
FIG. 5 is a configuration diagram depicting an essential part of a fourth embodiment of a multicarrier receiver according to the present invention.

FIG. 5 is a configuration diagram showing an essential part of a fourth embodiment of a multicarrier receiver according to the present invention. Reference numeral 501 indicates a shift register, reference numeral 502 indicates a selector, and reference numeral 503 indicates an F-BPF, respectively. Constituent portions corresponding to those shown in FIGS. 15, 1 and 4 are given the same reference numerals respectively.

In the same figure, the fifth embodiment includes the shift register 401, shift register 501, F-BPF 503 and selector 502 provided between the A/D converter 106 and the quadrature detector 107 under the configuration shown in FIG. 1. Incidentally, a section prior to the A/D converter 106 is identical to the configuration shown in FIG. 15. Thus, the third embodiment is of an embodiment more refined than the third embodiment shown in FIG. 4 for the purpose of packaging and is different from the third embodiment in terms of the position of insertion of the fractional delay filter (F-BPF 503) and the like.

The F-BPF 503 is of a digital filter which generates a delay or lead equivalent to twice (e.g., 51 nsec) the time resolution requested from a system, and includes an even number of tap coefficients in only one pair on a fixed basis.

The shift register 501 is of a fixed delay shift register equivalent to one-half the number of taps of the F-BPF 503. When the F-BPF 503 is of an impulse-response type BPF that consists of eight taps, the shift register 501 results in shift registers of four or five stages. When it is set to the four stages, then the passage of the F-BPF 503 results in a correction capability of +51 nsec. If it is set to the five stages, then the passage of the F-BPF 503 results in a correction capability of −51 nsec.

When the output of the F-BPF 503 or the output of the shift register 501 is selected by the selector 502, a delay amount can be corrected in resolution equal to twice the resolution required by the system.

The number of stages of the shift register 401 and the state of selection of the selector 502 are decided on the basis of the result of delay times measured by use of a measuring instrument at the manufacture or maintenance of each single carrier receiver 109 (See FIG. 15), and are written and stored in a unillustrated nonvolatile memory via an unillustrated CPU (Central Processing Unit) provided in the multicarrier receiver. Upon its operation, the nonvolatile memory is read out to set the written ones to the shift register 401 and the selector 502 of each single carrier receiver 109. These work operations can be automated and the manufacturing cost can drastically be reduced.

Assuming now that the A/D converter 106 is operating at 9.8304 MHz, a delay time unit correctable by the shift register 401 is 1/9.8304 MHz=102 nsec. Thus, the delay time of an arbitrary carrier can be held within a range of −51~+51 nsec with respect to a given reference delay. The difference in delay time between a carrier with a maximum delay and a carrier with a minimum delay results in 102 nsec. When the carrier with the maximum or minimum delay is adopted as a new reference delay at this time, it falls to the limit with respect to the standard of CPRI. Considering variations in delay of each analog part, it can be said that the carrier has no longer satisfied the standard. The standard is basically satisfied with an allowance, and correction is carried out in a resolution (of 51 nsec) equivalent to twice the standard.

Figure 6:
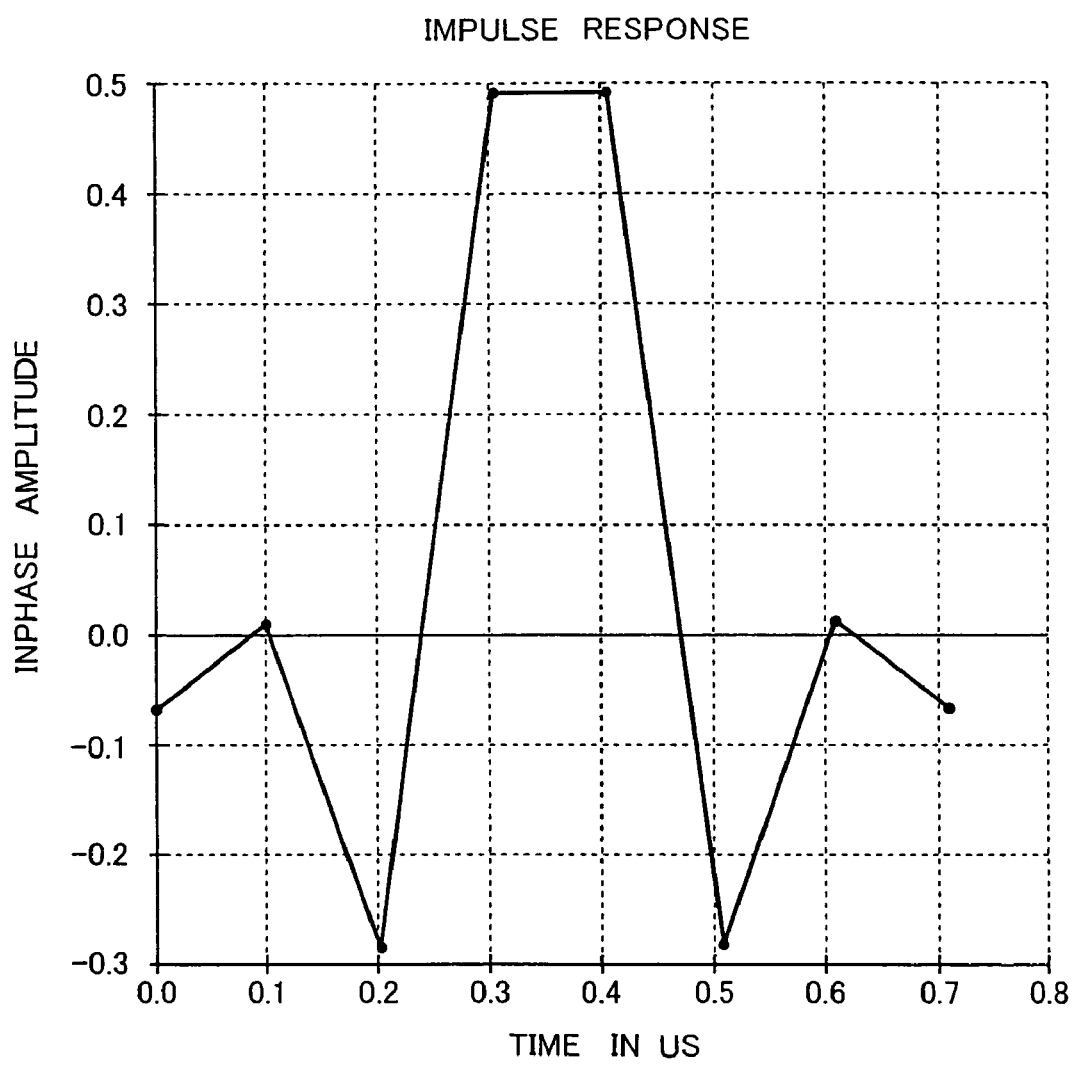
FIG. 6 is a diagram showing an impulse response of an F-BPF employed in the fourth embodiment shown in FIG. 5.

FIG. 6 is a diagram showing an impulse response of the F-BPF 503 employed in the fourth embodiment.

Since tap coefficients are provided in even-numbered form and symmetrical in the same figure, the two maximum tap coefficients appear in the neighborhood of the center of the impulse response. Smoothing the impulse response yields the maximum value between its two samples. Since the point where the maximum value is reached is assumed to show a group delay time, ½-unit delays corresponding to sample time intervals are obtained. Since the F-BPF 503 is used as a simple delay means so as to be switchable to the shift register 401 having no frequency characteristic, a frequency characteristic lying within at least a desired frequency band is made as small as negligible. Such a filter can easily be designed with a relatively small number of taps. This is designed as, for example, a BPF having eight taps, which is allowed to pass through the desired frequency band in FIG. 6.

An example in which a multicarrier is supposed to accommodate a delay deviation, will be shown here again.

Let's now consider operational states of two carriers for f1 and f2. Let's assume that the sum of delay deviations of analog parts such as the DUP 101 (see FIG. 15) and SAW filter 105 (see FIG. 15) with respect to a design reference value is 112 nsec at f1 and 50 nsec at f2. Under the standard of CPRI in this case, f1 is unachievable since the delay deviation is over 10 nsec and f2 falls into the pass. Accordingly, f1 is modified. Alternatively, f2 is delayed 51 nsec and in this condition, the delay amount of the shift register 401 is reduced (i.e., −102 nsec) to allow both f1 and f2 to coincide with the standard.

It can be expected that if the worst supposed delay deviation at each actual part is simply shifted slightly from +110 nsec/−100 nsec and the standard as described in [Background Art], such a delay deviation can satisfy the standard if only the lower or upper side of dispersion of the delay deviation is pulled in the center direction of its dispersion.

Considering such a configuration (hereinafter called "minimum configuration") that the shift register 401 is removed from FIG. 5, the minimum configuration is selected to either execution of correction in semi-CLK, i.e., in 51 nsec units (passage of F-BPF 503) or doing nothing or inactivity (passage of shift register 501). Since, however, the F-BPF 503 and the like are circuits that exist in f1 and f2 respectively, the passage of BPF is made to carry out correction based on 51 nsec with respect to f1, and the shift register is selected and no correction is made to f2. If done in this way, then the delay deviation of f1 results in 61 nsec and the delay deviation of f2 results in 50 nsec, whereby the delay deviations can satisfy the standard.

Figure 7:
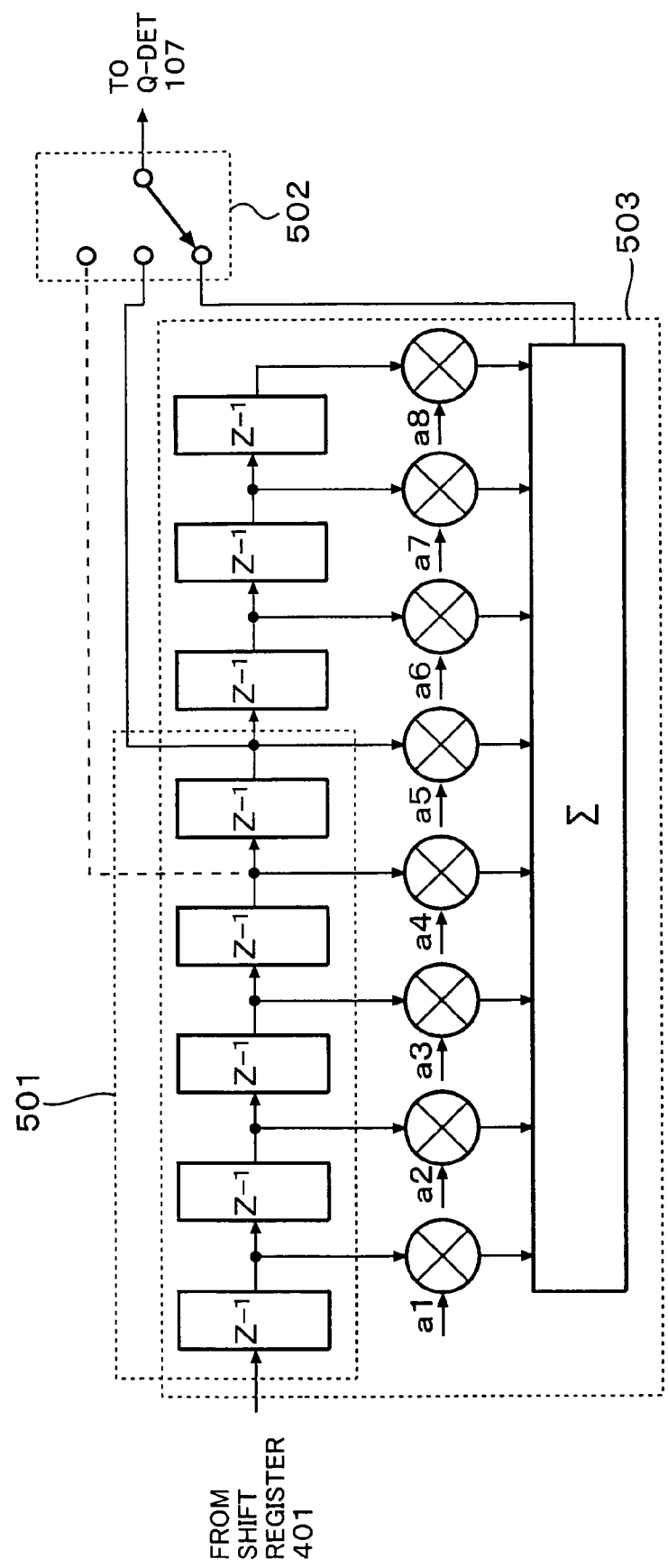
FIG. 7 is a configuration diagram showing one specific example illustrative of an F-BPF 503 and a shift register 501 shown in FIG. 5.

FIG. 7 is a configuration example illustrative of an F-BPF 503 and a shift register 501 suitable for the minimum configuration.

In the same figure, the F-BPF 503 and the shift register 501 are formed integrally. As indicated by a broken line, a selector 502 can select an output corresponding to a fourth tap of the shift register 501 as an option. The selector 502 is capable of selecting three types of delays of −0.5, 0, and +0.5 samples with the delay of the F-BPF 503 as the reference.

Although the four embodiments have been explained as described above, they are mere examples of the present invention. The present invention is not limited to the numerical values, processing procedures, and realizing means (hardware) specifically described in these embodiments. They may be made different from one another.

Since the downsampling ratio of the LPF 108 or the like becomes large in a normal method for setting a sampling clock of the A/D converter 106 to at least twice or more the time resolution prescribed by an interface and providing only the shift register 401 for each carrier to thereby perform delay correction, a circuit scale increases as a whole reception section. On the other hand, according to the present invention, a circuit scale can be prevented from increasing.

Applying the present invention to a base station apparatus under the environment of cellular mobile communications brings about a profound effect. There is a growing trend to separate a wireless section from a base station to make remote installation in a recent cellular system. In such a case, a load on the base station (i.e., a baseband signal processor) is reduced owing to the application of the present invention. Thus, the application of the present invention to a receiver of the base station apparatus enables a reduction in infrastructure cost. This brings about a large advantageous effect under such a mobile communication environment that the infrastructure cost finally assumes a user load.

The present invention includes a plurality of antennas for receiving specific receive signals as in the AAA (Adaptive Array Antenna) and MIMO (Multi Input Multi Output) regardless of a multicarrier. Correspondingly, the present invention can be applied even to such a receiver as to have a plurality of receiving sections. Although the phase synthesis has heretofore been performed in the AAA and MIMO, a delay time deviation which is large in the order of a chip rate at each receiving section, can be corrected simultaneously with it by the present invention.

Figure 8:
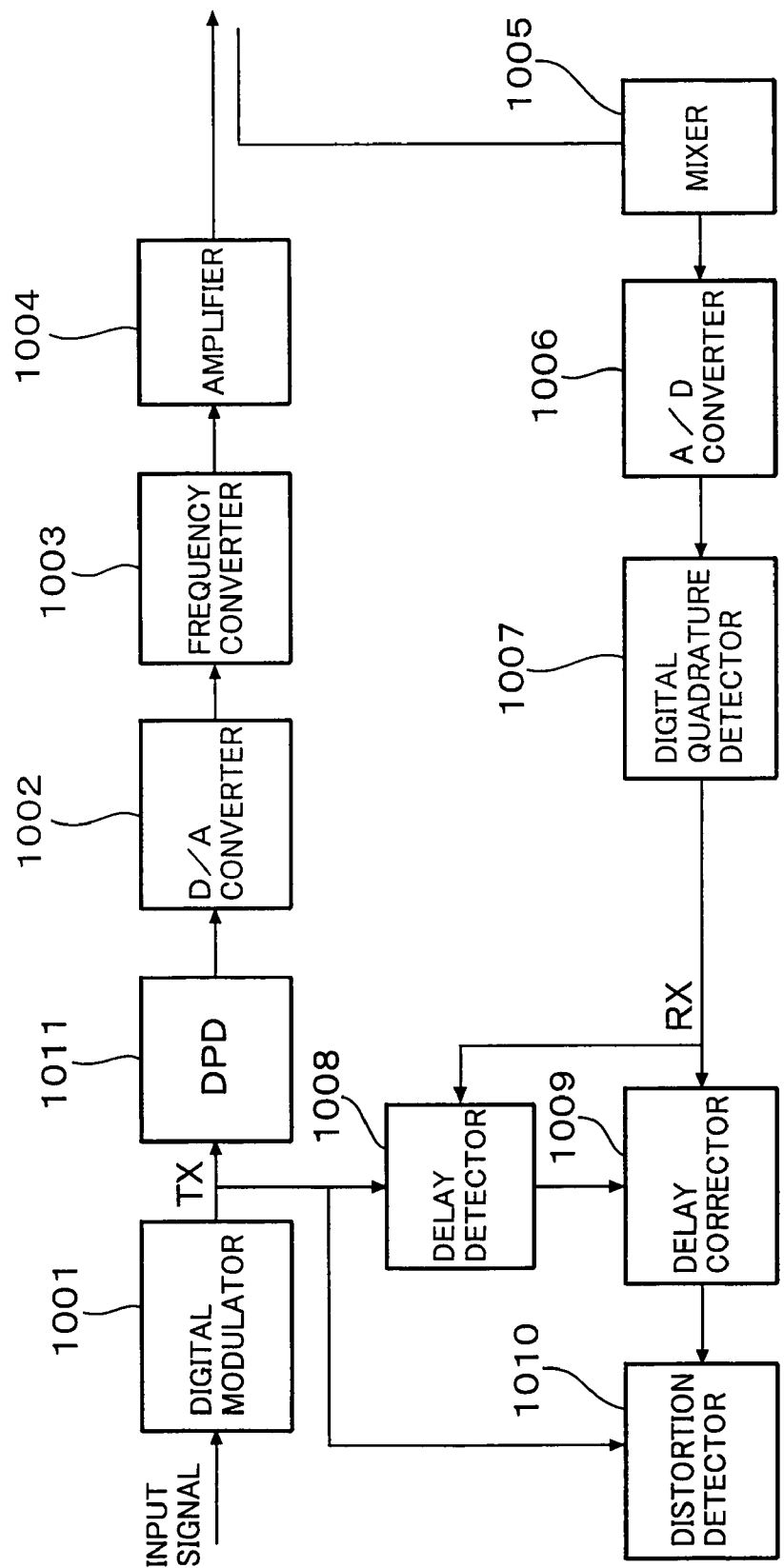
FIG. 8 is a configuration diagram illustrating an essential part of one embodiment of a transmitter with a delay correcting function according to the present invention.
Figure 16:
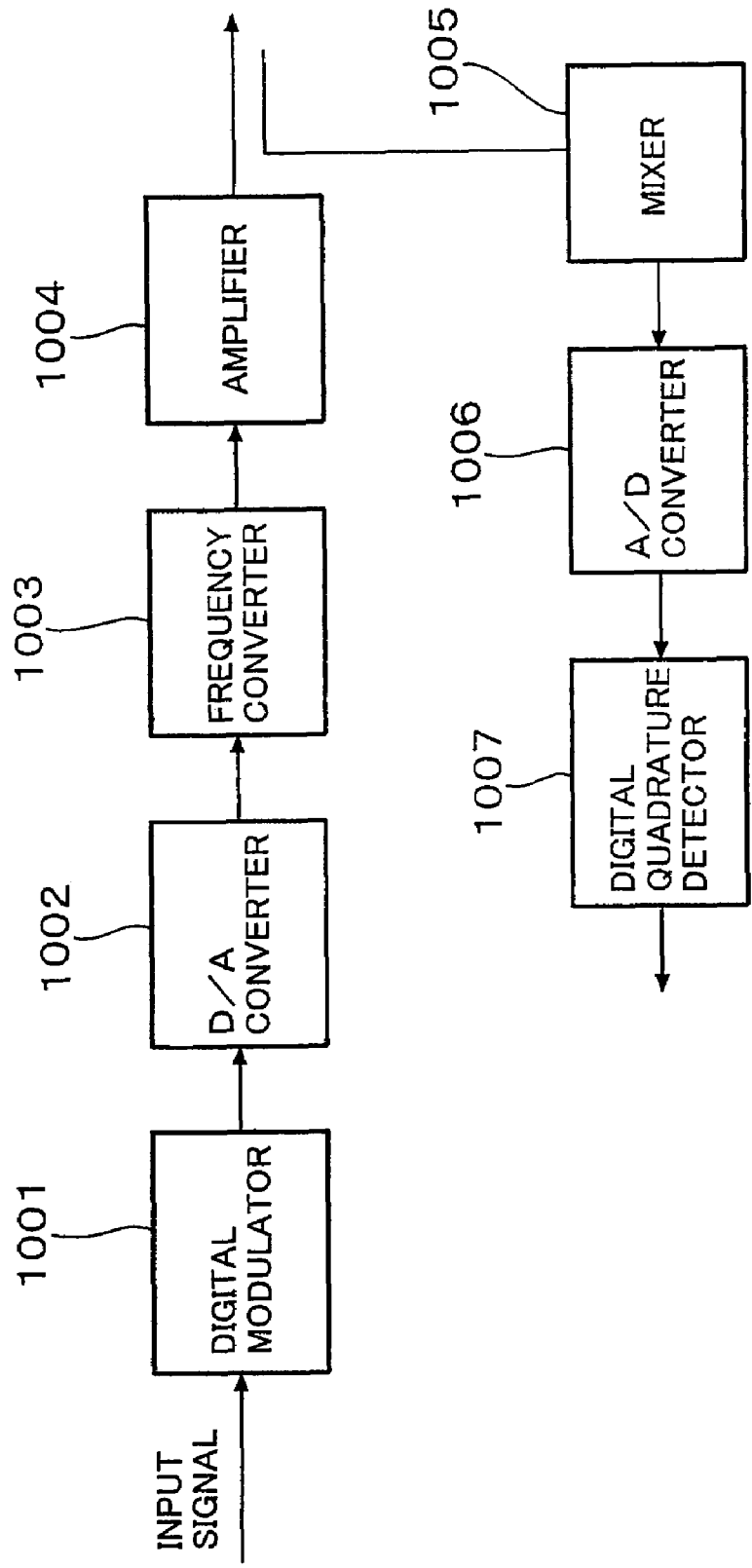

FIG. 8 is a configuration diagram showing an essential part of one embodiment of a transmitter with a delay correcting function according to the present invention. Reference numeral 1008 indicates a delay detector, reference numeral 1009 indicates a delay corrector, reference numeral 1010 indicates a distortion detector, and reference numeral 1011 indicates a DPD (Digital PreDistorter), respectively. Constituent portions corresponding to those shown in FIG. 16 are given the same reference numerals respectively.

Figure 17:
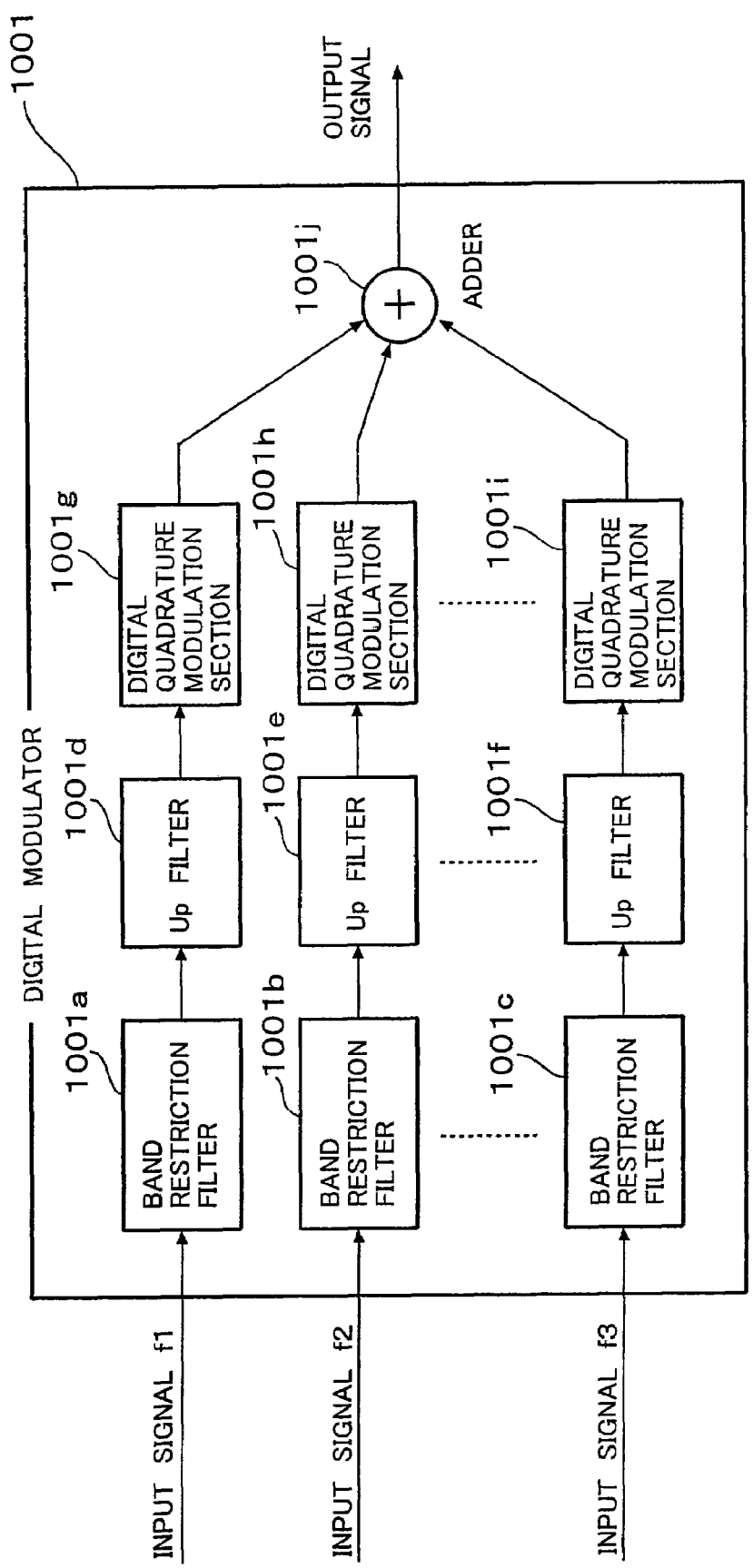
FIG. 17 is a block configuration diagram showing one example of a digital modulator shown in FIG. 16.

When distortion generated at a power amplifier 1004 is detected in the same figure, CDMA transmit signals are inputted to a digital modulator 1001 as I and Q phases of a baseband. Such transmit signals are respectively converted into IF signals at the digital modulator 1001 as described in FIG. 17 (the IF signals result in transmit signals TX of I and Q phases in this case), which in turn are supplied to the DPD 1011. The DPD 1011 applies a distortion characteristic opposite to the distortion characteristic generated at the power amplifier 1004 to the transmit signals TX of I and Q phases. A D/A converter 1002 converts the transmit signals TX to analog IF signals. A frequency converter 1003 converts the same into quadrature-modulated RF signals for a 1 channel, followed by being power-amplified by a power amplifier 1004. When the proper distortion characteristic is added at the DPD 1011, the distortion generated at the power amplifier 1004 is cancelled by such a distortion characteristic. Thus, the distortion-free transmit signals of I and Q phases can be obtained from the power amplifier 1004.

Some of the RF signals outputted from the power amplifier 1004 are supplied to a mixer 1005 where they are converted into IF signals, which in turn are converted to digital signals by an A/D converter 1006. Thereafter, they are detected to impulse signals as the I and Q phases at a digital quadrature detector 1007 (they are feedback signals RX of I and Q phases in this case).

Here, the transmit signals TX of I and Q phases outputted from the digital modulator 1001 are supplied to the delay detector 1008. The feedback signals RX of I and Q phases outputted from the digital quadrature detector 1007 are supplied to the delay detector 1008. Delay amounts of the feedback signals RX with respect to the transmit signals TX of I and Q phases are detected. The delay corrector 1009 corrects, for example, the delay amounts of the feedback signals RX of I and Q phases according to the detected delay amounts to thereby correct timing shifts with the transmit signals TX of I and Q phases. And the distortion detector 1010 performs analytic processing based on the transmit signals TX of I and Q phases and feedback signals RX thereof to thereby detect distortion components of the feedback signals RX of I and Q phases, generated by the power amplifier 1004. The distortion characteristic of the DPD 1011 is set based on the detected distortion components, so that the distortion components produced at the power amplifier 1004 are cancelled.

Here, the delay detector 1008 detects the delay amounts of the feedback signals RX of I and Q phases with respect to the transmit signals TX of I and Q phases in time units each shorter than one sample time. It is thus possible to correct shifts in timing between the transmit signals TX of I and Q phases and feedback signals RX thereof with a high degree of precision and detect the distortion of the feedback signals RX of I and Q phases with a high degree of precision. Accordingly, even when information signals are transmitted, the distortion generated at the power amplifier 1004, of the transmit signals TX can be suppressed with a high degree of precision.

To this end, the delay detector 1008 performs coarse delay detection in a 1 sample unit and small or slight delay detection in a time unit shorter than a 1 sample time as the detection of the delay amounts of the transmit signals TX and feedback signals RX of I and Q phases. The correction for the delay amounts of the feedback signals RX or transmit signals TX of I and Q phases is carried out based on the delay amounts obtained from the coarse delay detection and slight delay detection. It is thus possible to correct shifts in timing between the transmit signals TX of I and Q phases and feedback signals RX thereof with a high degree of precision in the time unit shorter than the 1 sample unit, and to detect the distortion with a high degree of precision.

Figure 9:
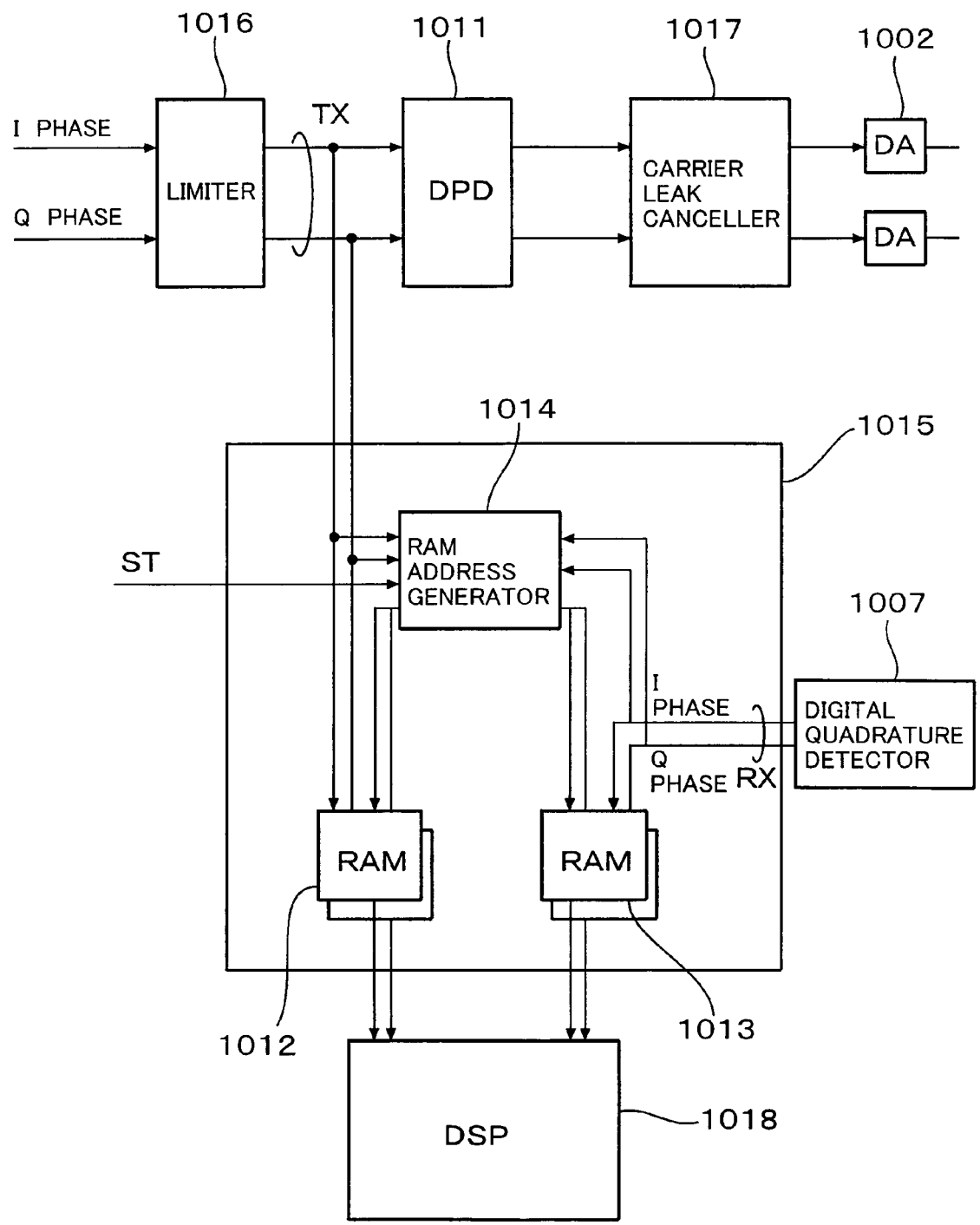
FIG. 9 is a configuration diagram showing one specific example of a coarse delay detection/correction section at a delay detector and a delay corrector shown in FIG. 8, and its peripheral section.

FIG. 9 is a configuration diagram showing one specific example illustrative of the delay detector 1008 and the delay corrector 1009 shown in FIG. 8, and its peripheral section. Reference numerals 1012 and 1013 indicate RAMs, reference numeral 1014 indicates an address generator, reference numeral 1015 indicates a coarse delay detection/correction section, reference numeral 1016 indicates a limiter, reference numeral 1017 indicates a carrier leak canceller, and reference numeral 1018 indicates a DSP (Digital Signal Processor), respectively. Constituent portions associated with those shown in FIG. 8 are given the same reference numerals respectively.

In the same figure, the transmit signals TX of I and Q phases outputted from the digital modulator 1001 (see FIG. 8) are suppressed in peak power at the limiter 1016. A distortion characteristic opposite to that at the power amplifier 1004 (see FIG. 8) is applied thereto by the DPD 1011. The carrier leak canceller 1017 corrects unbalances in I and Q phases generated at the subsequent-stage D/A converters 1002 and frequency converter 1003 and supplies the result of their correction to their corresponding D/A converters 1002. Further, the coarse delay detection/correction section 1015 mainly performs coarse delay detection and correction, and the DSP 1018 performs slight delay detection and correction. Combined one of the two is equivalent to the delay detector 1008 and delay corrector 1009 shown in FIG. 8.

When coarse delays are detected, the known impulse signals are used as transmit signals TX of I and Q phases, and shifts (delay amounts) in timing between the transmit signals TX and feedback signals RX are detected. That is, the transmit signals TX of which at least one of the I and Q phases consists of the impulse signal are supplied to the coarse delay detection/correction section 1015 in place of normal transmit signals. Further, the feedback signals RX of I and Q phases outputted from the digital quadrature detector 1007 are also supplied to the coarse delay detection/correction section 1015.

The coarse delay detection/correction section 1015 is provided with RAMs 1012 and 1013 and an address generator 1014, etc. Coarse delay detection is effected upon factory production and maintenance. When the operation of detecting delay amounts is started, the address generator 1014 starts the generation of write addresses for the RAMs 1012 and 1013. Along with it, at least one impulse signal (may be a signal subsequent to upsampling) of I and Q phases is inputted to either carrier of the digital modulator 1001 (see FIG. 8). Thus, the transmit signals TX of I and Q phases outputted from the limiter 1016 are transmitted to the DPD 1011 as described above and supplied even to the coarse delay detection/correction section 1015, where sequential samples of the transmit signals TX of I and Q phases are sequentially stored at their corresponding write addresses generated at the address generator 1014 for the corresponding RAM 1012. At this time, the address generator 1014 detects the levels of the supplied transmit signals TX of I and Q phases every samples. When a peak level for each sample is detected, it holds, as APTX, a write address (hereinafter called "peak address") of the corresponding RAM 1012 in which I and Q phases of its peak level are stored.

The feedback signals (impulse signals) RX of I and Q phases outputted from the digital quadrature detector 1007 are also supplied to the coarse delay detection/correction section 1015. Sequential samples are sequentially stored in the corresponding RAM 1013 at the same write addresses as those of the RAM 1012 generated at the address generator 1014. Even in this case, the address generator 1014 detects the levels of the feedback signals RX of I and Q phases. When a peak level thereof is detected, it holds, as $A_{PRX}$, a write address (peak address) of the corresponding RAM 1013 in which the peak level is stored.

Figure 10A:
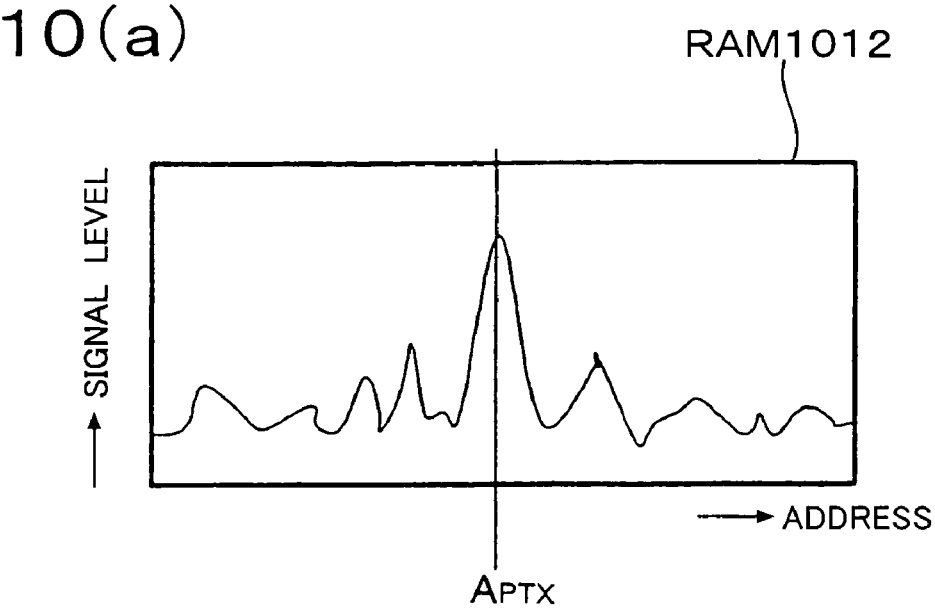
FIG. 10 is a diagram typically showing a stored state of a RAM and coarse delay detection/correction in FIG. 9.
Figure 10B:
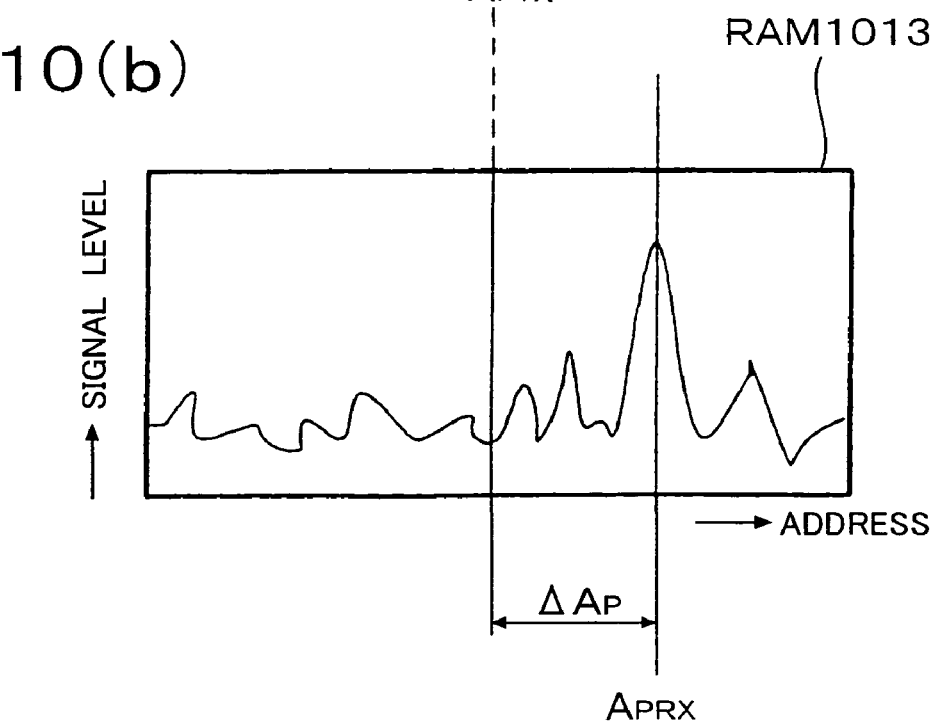

FIG. 10 typically shows the states of storage of the RAMs 1012 and 1013 shown in FIG. 9. The same figure (a) indicates the state of storage of impulses of the transmit signals TX into the RAM 1012, and the same figure (b) indicates the state of storage of the feedback signals RX into the RAM 1013, respectively. The horizontal axis indicates an address and the vertical axis indicates a signal level, respectively. Although not shown in the figure here, one address unit shown in each of FIGS. 10(*a*) and 10(*b*) corresponds to one sample interval of each impulse signal.

The difference between the address $A_{PTX}$ at the peak of the transmit signals TX at the RAM 1012, which is shown in FIG. 10(*a*) and the address $A_{PRX}$ at the peak of the feedback signals RX at the RAM 1013, which is shown in FIG. 10(*b*), i.e., the following results in a shift (delay amount) in timing between each of the transmit signals TX and each of the feedback signals RX in sample units:

$$\Delta A_P = A_{PRX} - A_{PTX}$$

Incidentally, when the sample frequency of the transmit signals TX outputted from the digital modulator 1001 is assumed to be 92.16 MHz in the W-CDMA system as described above, the time interval of one sample is about 10 nsec, and one address interval at each of the RAMs 1012 and 1013 is equivalent to about 10 nsec. Incidentally, the detection of each peak level may be done by the DSP 1018 other than by the address generator.

Thus, when the transmit signals TX of I and Q phases are stored in the RAM 1012 and the feedback signals RX of I and Q phases are stored in the RAM 1013 for a predetermined period, the RAMs 1012 and 1013 are brought into such stored states as shown in FIG. 10. The address generator 1014 generates read addresses and reads the RAMs 1012 and 1013 at the read addresses. In such a case, however, the read address of the RAM 1013 is modified by $\Delta A_P$ between the peak addresses to allow the peak addresses of the read addresses of the RAMs 1012 and 1013 to be equal to each other. That is, the peak address $A_{PRX}$ of the RAM 1013 at reading is set to $A_{PRX}=A_{PRX}-\Delta A_P=A_{PTX}$. Therefore, the read address $A_{PRX}$ at the RAM 1013 is expressed in the following equation assuming that an address at writing is $A_{WRX}$:

$$A_{PRX}=A_{WRX}\Delta A_P$$

Owing to such address correction, the peaks of the transmit signals TX of I and Q phases stored in the RAM 1012 and the peaks of the feedback signals RX of I and Q phases stored in the RAM 1013 are read in the same timing upon reading of the RAMs 1012 and 1013. Thus, the delay amounts of these transmit signals TX and feedback signals RX are corrected in sample time interval units. The delay amounts are fixedly stored and used for correction of each coarse delay in the subsequent operation. Since the delay amounts are brought to change due to a secular variation thereof or the like, higher-precision delay detection in operation is actually required.

Therefore, the transmit signals TX and feedback signals RX of I and Q phases whose delay amounts are corrected in sample units, which are outputted from the coarse delay detection/correction section 1015, are supplied to the DSP 1018, where processing for slight delay detection/correction is performed.

The principle of slight delay detection will first be explained here using FIG. 11 prior to the description of the slight delay detecting process at the DSP 1018.

FIG. 11(*a*) schematically shows a time waveform of each of transmit signals TX of I and Q phases and a time waveform in the neighborhood of the peak of a feedback signal RXa(i) corresponding to one example of feedback signals RX of I and Q phases. Ts is assumed to be one sample time interval. Let's assume that the feedback signal RXa(i) leads the transmit signal TX by a time of Ts/4 by means of the coarse delay correction. Marks ● indicate sample data read from the RAMs 1012 and 1013. The signals TX and RXa(i) also indicate between the sample data to make a brief description. Further, the signals TX and RX respectively indicate signals read from the RAMs 1012 and 1013. Furthermore, . . . , n−1, n, . . . located in the horizontal axis indicate arbitrary sample points. i is commonly given to the signals TX and RX and indicate indexes (corresponding to the read addresses generated from the address generator 1014) of sample points that increase with time.

FIG. 11(*b*) shows a case in which the feedback signal RXa(i) is delayed by Ts/4. Each of the feedback signals RX in this case is taken as RXb(i). At this time, a feedback signal obtained by delaying the feedback signal RXb(i) by one sample time is expressed as RXb(i−1), and a feedback signal obtained by allowing the feedback signal RXb(i) to lead by one sample time is represented as RXb(i+1). Each of amplitude values (each of which does not exist on the RAM 1013 but is realistically reproducible by an interpolation filter or a slight delay generation LPF 1080 to be described later, and these values are collectively called "data values" and taken below in like manner), whose each value of the delayed feedback signal RXb(i−1) is obtained at the same sample point n as a transmit signal TX(i), is indicated by a mark ○. In like manner, each amplitude value of the feedback signal RXb(i+1), which is obtained at the sample point n of the transmit signal TX, is indicated by a mark Δ.

In this case, the transmit signal TX and the delay feedback signal RXb are substantially coincident in timing with each other. At this time, the data values of the feedback signals RXb(i−1) and RXb(i+1) at the sample point n of the transmit signal TX are approximately equal to each other.

FIG. 11(c) illustrates a case in which the feedback signal RXa is delayed by Ts/2. Each of the feedback signals RX in this case is taken as RXc(i). A feedback signal obtained by delaying the feedback signal RXc(i) by one sample time is expressed as RXc(i−1), and a feedback signal obtained by allowing the feedback signal RXc(i) to lead by one sample time is represented as RXc(i+1). Each data value obtained at a sample point n of a transmit signal TX, of the delayed feedback signal RXc(i−1) is indicated by a mark ○. Each data value of the feedback signal RXb(i+1), obtained at the sample point n of the transmit signal TX is indicated by a mark A.

In this case, the feedback signal RXc obtained by delaying the feedback signal RX by Ts/2 is delayed Ts/4 alone with respect to the transmit signal TX. At this time, the data values of the feedback signals RXc(i+1) and RXc(i−1) at the sample point n of the transmit signal TX are different from each other, and the former thereof becomes large in absolute value.

FIG. 11(d) shows a case in which the feedback signal RXa is caused to lead by Ts/2 in the direction opposite to that shown in FIG. 11(c). Each of the feedback signals RX in this case is expressed as RXd. And a feedback signal obtained by delaying the feedback signal RXd by one sample time is expressed as RXd(i−1), and a feedback signal obtained by allowing the feedback signal RXd to lead by one sample time is represented as RXd(i+1). A data value of the feedback signal RXd(i−1), which is obtained at a sample point n of a transmit signal TX, is indicates by a mark ○. A data value of the feedback signal RXd(i+1), which is obtained at the sample point n of the transmit signal TX, is indicated by a mark A.

In this case, the feedback signal RXd obtained by allowing the feedback signal RXa to lead by Ts/2 leads the transmit signal TX by 3Ts/4. At this time, the data values of the feedback signals RXd(i+1) and RXd(i−1) at the sample point n of the transmit signal TX are different from each other, and the latter thereof becomes large in absolute value.

As apparent from FIGS. 11(b) through 11(d), the absolute value of the difference between the data values at the sample point n of the transmit signal TX, of the feedback signal RX(i+1) advanced by one sample time and the feedback signal RX(i−1) delayed by one sample time is small by delaying and advancing the feedback signal RXa within the range of one sample time as a shift in timing between the feedback signal RX and transmit signal TX becomes small. The sign of the difference becomes positive when the feedback signal RX leads the transmit signal TX.

Incidentally, the impulse signal is not limited to a baseband signal. It may preferably be applied in the form of an IF signal frequency-converted into an IF band after being subjected to a suitable band restriction. In such a case, impulse signals lying in the IF band are written into the RAM 1013 in advance by the DSP 1018 upon coarse delay measurements without writing transmit signals into the RAM 1013. The impulse signals may be read therefrom and supplied to the DPD 1011 as transmit signals TX.

Thus, when the timings of the feedback signals RX are varied within a time range lying within one sample time interval in such a manner that the correlation between the data values of the feedback signals RX(i−1) and RX(i+1) at the sample point n of the transmit signal TX becomes the highest, the amount of adjustments in timings of the feedback signals RX at that time results in the amount of a shift in timing of the feedback signals RX in one sample time interval with respect to the transmit signals TX, i.e., a slight delay amount. Of course, the present slight delay amount is a value of ±.

Although the slight delay detecting method using the impulses described above is simple and relatively good in reproducibility and obtains degree of precision, the impulses cannot actually be wireless-transmitted and hence the slight delay detecting method cannot be carried out in operation.

Thus, in the present embodiment, a normal modulated wave is used as the transmit signal TX(i). In FIG. 11, a cross-correlation value between the transmit signal TX(i) and the feedback signal RX(i−1) obtained by delaying the feedback signal RX(i) as described above, and a cross-correlation value between the transmit signal TX(i) and the feedback signal RX(i+1) obtained by advancing the feedback signal RX(i) as described above are respectively determined. The amount of adjustments in timing of the feedback signals RX or the transmit signals TX at the time that these cross-correlation values are closest, is assumed to be a slight delay amount.

In the present embodiment, the time interval corresponding to one sample of each of the transmit signal TX(i) and the feedback signal RX(i) is assumed to be Ts. The feedback signal RX(i) is delayed by N·Ts/M (where M is an integer greater than or equal to 2. N is an integer which is greater than or equal to −(M−1) and less than or equal to (M−1), and when N is negative, the feedback signal is advanced by |N|·Ts/M). Further, the feedback signal is delayed by ± one sample time. The cross correlation between feedback signals $RX_N(i-1)$ and $RX_N(i+1)$ obtained by such delays in this way is determined. A description will first be made of a cross correlation value between each of the transmit signals TX(i) and each of the feedback signals RXN(i−1).

Now assume that the following are defined at arbitrary sample points as follows:

a data value at a sample point n, of an I phase of the transmit signals TX(i): TXI(i), a data value at a sample point n, of a Q phase of the transmit signals TX(i): TXQ(i), a data value of an I phase of the feedback signals $RX_N(i-1)$ at the same sample point n as the transmit signals TX(i): $RXI_N(i-1)$, and a data value of a Q phase of the feedback signals $RX_N(i-1)$ at the same sample point n as the transmit signals TX(i): RXQN(i−1).

As to the I and Q phases of the transmit signals TX(i) and the feedback signals $RX_N(i-1)$, the following are obtained:

$$Im_N = \sum_{i=n}^{n+k-1} \{TXI(i) \times RXI_N(i-1) + TXQ(i) \times RXQ_N(i-1)\} \quad (1)$$

$$Qm_N = \sum_{i=n}^{n+k-1} \{TXQ(i) \times RXI_N(i-1) - TXI(i) \times RXQ_N(i-1)\} \quad (2)$$

where Σ adds the results of computations in parentheses { } at k sample points from i=n to i=n+k−1. This means that a cross correlation is taken over the number of samples k. Power computations on these $Im_N$ and $Qm_N$ are carried out to determine a cross-correlation value $Sm_N$ between the transmit signals TX(i) and feedback signals $RX_N(i-1)$, i.e., the following:

$$Sm_N = Im_N + Qm_N \quad (3)$$

A cross-correlation value between each of the transmit signals TX(i) and each of the feedback signal $RX_N(i+1)$ will next be explained.

Assuming now that following are defined in the same manner as described above:

a data value at a sample point n, of an I phase of the transmit signals TX(i): TXI(i), and a data value at the sample point n, of a Q phase of the transmit signals TX(i): TXQ(i), a data value of an I phase of the feedback signals $RX_N(i+1)$ at the same sample point n as the transmit signals TX(i): $RXI_N(i+1)$, and a data value of a Q phase of the feedback signals $RX_N(i+1)$ at the same sample point n as the transmit signals TX(i): $RXQ_N(i+1)$ As to the I and Q phases of the transmit signals TX(i) and the feedback signals $RX_N(i+1)$, the following are obtained in like manner:

$$Ip_N = \sum_{i=n}^{n+k-1} \{TXI(i) \times RXI_N(i+1) + TXQ(i) \times RXQ_N(i+1)\} \quad (4)$$

$$Qp_N = \sum_{i=n}^{n+k-1} \{TXQ(i) \times RXI_N(i+1) - TXI(i) \times RXQ_N(i+1)\} \quad (5)$$

Then, power computations on these $Ip_N$ and $Qp_N$ are carried out to determine a cross-correlation value $Sp_N$ between the transmit signals TX(i) and feedback signals $RX_N(i+1)$, i.e., the following:

$$Sp_N = Ip_N^2 + Qp_N^2 \quad (6)$$

A cross-correlation value difference $S_N$ between the transmit signals TX(i) and feedback signals RX(i), i.e., the following is determined from the cross-correlation value $Sm_N$ obtained in the equation (3) and the cross-correlation value $Sp_N$ obtained in the equation (6):

$$S_N = Sm_N - Sp_N \quad (7)$$

By changing delay times within one sample time for the feedback signals RX of I and Q phases, such a cross-correlation value difference $S_N$ can be determined with respect to an arbitrary N, i.e., delay times of −(M−1)Ts/M, −(M−2)Ts/M, . . . , −2Ts/M, −Ts/M, 0, +Ts/M, +2Ts/M, . . . , +(M−2)Ts/M, and +(M−1)Ts/M. That is, the cross-correlation value difference SN of the equation (7) is determined every these delay times. When the cross-correlation value difference $S_N$ is of a minimum value, the timings of the feedback signals RX are adjusted based on a delay amount at that time, whereby the transmit signals TX and the feedback signals RX are made most coincident in timing. Accordingly, the amount of adjustments in timing of the feedback signals RX results in a slight delay amount in one sample time between the transmit signals TX and the feedback signals RX.

Incidentally, in the present embodiment, the feedback signals RX are delayed by the time of N·Ts/M and delayed by the ±1 sample time to thereby generate the feedback signals $RX_N(i+1)$ and $RX_N(i-1)$, and the correlation between the feedback signals and the transmit signals TX(i) is determined. However, the transmit signals TX(i) are delayed in this way to generate transmit signals $TX_N(i+1)$ and $TX_N(i-1)$, and the correlation between those and the feedback signals RX(i) may be determined. Alternatively, either one of the transmit signals TX(i) and the feedback signals RX(i) are delayed by the time of N·Ts/M and the other thereof are delayed by the ±1 sample time, whereby the correlation between these may be determined using these delay signals. The delay is not limited to the delay of ±1 sample time, and a delay of ±plural sample times may be applied with one-half of one chip time as an upper limit.

Figure 12:
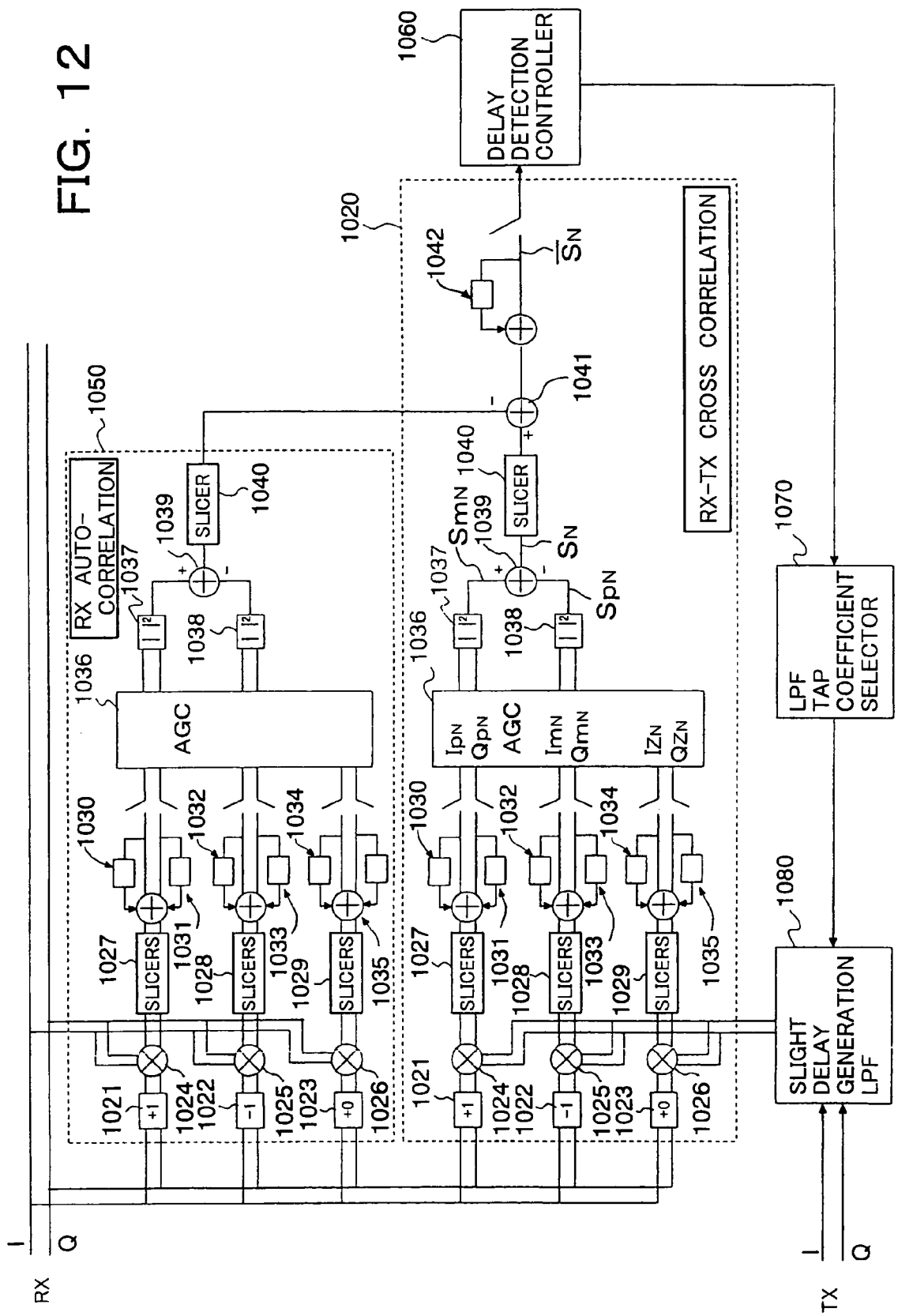
FIG. 12 is a block diagram illustrating one specific example of a DSP shown in FIG. 9.

FIG. 12 is a block diagram showing one specific example of the DSP 1018 shown in FIG. 9, which detects the slight delay amount in the above-described manner. It has been optimized so as to be capable of being realized by fixed-point arithmetic alone. Reference numeral 1020 indicates a cross-correlation detector, reference numerals 1021 indicate +1 delayers, reference numerals 1022 indicate −1 delayers, reference numerals 1023 indicate +0 delayers, reference numerals 1024 through 1026 indicate multipliers, reference numerals 1027 through 1029 indicate slicers, reference numerals 1030 through 1035 indicate accumulative adders, reference numerals 1036 indicate AGC (Automatic Gain Control) units, reference numerals 1037 and 1038 indicate square adders, reference numerals 1039 indicate subtracters, reference numerals 1040 indicate slicers, reference numeral 1041 indicates a subtracter, reference numeral 1042 indicates an accumulative adder, reference numeral 1050 indicates an autocorrelation detector, reference numeral 1060 indicates a delay detection controller, reference numeral 1070 indicates an LPF tap coefficient selector, and reference numeral 1080 indicates a slight delay generation LPF, respectively. These form a so-called DLL (Delay Locked Loop).

In the description of the detection of the slight delay, the feedback signals RX are delayed by the time of N/M times (where M: integer greater than or equal to 2, and N: integer greater than or equal to −(M−1) and less than or equal to +(M−1) as described above) the sample time interval Ts. Further, the feedback signals $RX_N(i+1)$ and $RX_N(i-1)$ delayed by the ±1 sample time are generated and the slight delay is detected from the feedback signals and the transmit signals TX. In the present specific example, however, the feedback signals RX(i+1) and RX(i−1) obtained by delaying the feedback signals RX by the +1 sample time are generated from the feedback signals RX. The transmit signals $TX_N$ obtained by delaying the transmit signals TX by the time of N/M times the sample time interval Ts are generated from the transmit signals TX. The shifts (delay times) in timing between the transmit signals TX and the feedback signals RX are detected with the accuracy of Ts/M unit using the feedback signals RX(i+1) and RX(i−1) and the transmit signals $TX_N$.

To this end, the feedback signals RX of I and Q phases read from the corresponding RAM 1013 (see FIG. 9) are supplied directly to the cross-correlation detector 1020 in FIG. 12, whereas the transmit signals TX of I and Q phases read from the corresponding RAM 1012 (see FIG. 9) are supplied to the slight delay generation LPF 1080, where a slight delay corresponding to NTs/M is effected on them, which in turn are supplied to the cross-correlation detector 1020. The configuration of the slight delay generation LPF 1080 corresponds to an FIR filter having the number of taps L equivalent to the F-LPF 201 or the like employed in the embodiment of the previous multicarrier receiver. Its delay time changes according to a tap coefficient for the slight delay generation LPF 1080, which is generated at the LPF tap coefficient selector 1070 under the control of the delay detection controller 1060. The delay time set to the slight delay generation LPF 1080 corresponds to $\{(N/M)+(L+1)/2\}$Ts. The delay time varies by changing N. Thus, the previous $\Delta A_p$ is preferably small by $(L+1)/2$.

In the cross-correlation detector 1020, the +1 delayer 1021 delays the feedback signals RX of I and Q phases by one sample time Ts to generate feedback signals RX(i–1) of I and Q phases. The feedback signals RX(i–1) of I and Q phases are supplied to the multiplier 1024, where a complex conjugate multiplication of the transmit signals $TX_N$ of I and Q phases sent from the slight delay generation LPF 1080 by ones inside the parentheses of the equations (1) and (2), i.e., the following calculation is performed:

$$TXI_N(i) \times RXI(i-1) + TXQ_N(i) \times RXQ(i-1)$$

Two results of computations by the multiplier 1024 are supplied to the accumulative adders 1030 and 1031 through the slicer 1027, where the results of multiplication obtained every sample points are accumulated and added together, so that the results of computations $Im_N$ and $Qm_N$ at the equations (1) and (2) are obtained.

Here, the slicer 1027 is used to fixedly reduce the level of each computed value in such a manner that the accumulated/added values of such results of computations $Im_N$ and $Qm_N$ do not overflow a bit length of a register. Assuming now that accumulative addition is made at 256 ($=2^8$) sample points, the slicer 1027 performs 8-bit shifting to set these results of computations $Im_N$ and $Qm_N$ to $\frac{1}{256}$ times.

Similarly, the –1 delayer 1022 allows the feedback signals RX of I and Q phases to lead by one sample time Ts to thereby generate feedback signals RX(i–1) of I and Q phases. The generated feedback signals are supplied to the multiplier 1025 where a complex conjugate multiplication of the transmit signals $TX_N$ of I and Q phases sent from the slight delay generation LPF 1080 by ones inside the parentheses of the above equations (4) and (5), i.e., the following calculation is carried out:

$$TXQ_N(i) \times RXI(i-1) - TXI_N(i) \times RXQ(i-1)$$

Two results of computations by the multiplier 1025 are supplied to the accumulative adders 1032 and 1033 through the slicer 1028 similar to the slicer 1027, where the results of computations obtained every sample points are accumulated and added together, so that the results of computations $Ip_N$ and $Qp_N$ at the equations (4) and (5) are obtained.

Further, the +0 delayer 1023 delays the feedback signals RX of I and Q phases by a 0 sample time and supplies the same to the multiplier 1026 as feedback signals RXI(0) and RXQ(0) of I and Q phases, where the following computations associated with the transmit signals $TX_N$ of I and Q phases sent from the slight delay generation LPF 1080 and the above equations (1) and (2), i.e., the following computations are performed:

$$TXI_N(i) \times RXI(i) + TXQ_N(i) \times RXQ(i) \quad (8)$$

$$TXQ_N(i) \times RXI(i) - TXI_N(i) \times RXQ(i) \quad (9)$$

Two results of computations by the multiplier 1026 are supplied to the accumulative adders 1034 and 1035 through the slicer 1029 similar to the slicer 1027, where the results of computations of the equations (8) and (9) obtained every sample points are accumulated and added together, so that the results of computations $IZ_N$ and $QZ_N$ corresponding to the results of computations $Im_N$ and $Qm_N$ at the equations (1) and (2) are obtained.

The accumulated/added values $Im_N$, $Qm_N$, $Ip_N$, $Qp_N$, $IZ_N$ and $QZ_N$ obtained in the above-described manner are supplied to the AGC unit 1036. The AGC unit 1036 divides average values thereof by the same ratio (inclusive of mere bit-shifting) in such a manner that the maximum value of these accumulated/added values reaches a predetermined value or less. Here, if a shift in timing between each of the transmit signals TX and each of the feedback signals RX is sufficiently smaller than Ts, then the mean or average value of the accumulated/added value $IZ_N$ at the equation (8) reaches the maximum.

The accumulated/added values $Im_N$ and $Qm_N$ processed at the AGC unit 1036 are supplied to the square adder 1037, where the power computation of the equation (3) is effected thereon, so that a powerization cross-correlation value $Sm_N$ is obtained. Similarly, the accumulated/added values $Ip_N$ and $Qp_N$ processed at the AGC unit 1036 are supplied to the square adder 1038, where the power computation of the equation (6) is effected thereon, so that a powerization cross-correlation value $Sp_N$ is obtained. These powerization cross-correlation values $Sm_N$ and $Sp_N$ are supplied to the adder 1039, where the computation of the equation (7) is performed thereon, so that a cross-correlation value difference $S_N$ is obtained.

Incidentally, the above computations are performed plural times with respect to the same delay amount $N \cdot Ts/M$ of the transmit signals TX, which is generated by the slight delay generation LPF 1080. And the slicer 1040 and the accumulative adder 1042 determine the average value of plural cross-correlation value differences $S_N$ obtained with respect to the same delay amount $N \cdot Ts/M$. Assuming that, for example, the above computations are performed 8 ($=2^3$) times with respect to the same delay amount $N Ts/M$ to determine cross-correlation value differences $S_N$ eight times, the accumulative adder 1042 accumulates and adds these eight cross-correlation value differences $S_N$. The slicer 1040 3-bit shifts them and $\frac{1}{8}$-divides the same to obtain an averaged cross-correlation value difference $S_N$.

The role of the autocorrelation detector 1050 having such a configuration will now be explained. It is desirable to make the number of correlation samples as small as possible in view of a processing time upon its commercialization. When, however, the number of the correlation samples is made small, the rate of errors contained in each cross-correlation value becomes large. Particularly when an attempt is made to detect a slight delay in a fine time width, a value out of the value of the proper slight delay is detected. This actually takes place because since the accuracy of calculation of each cross-correlation value is poor even if the timings of the transmit signals TX and feedback signals RX coincide with each other, the output of the slicer 1040 is not brought to zero.

Since, however, the timings of the transmit signals TX and the feedback signals RX are made coincident with each other here, the output of the slicer 1040 in the autocorrelation detector 1050 also becomes the same value if autocorrelation of the feedback signals RX is performed in the same sample timing. Thus, if the autocorrelation value of the feedback signals RX is subtracted from the cross-correlation value between the transmit signals TX and the feedback signals RX, then generated errors can be eliminated because the number of correlation samples is small.

The DSP 1018 is very complicated and particularly repeats correlation (=complex multiplication +accumulative addition) and filtering processing (=sum-of-products computation is repeated by the number of loops corresponding to the number of data X tap coefficient) many times. Therefore, the DSP 1018 needs huge numbers of computational steps. The DSP 1018 updates distortion compensation coefficients of the DPD 1011 and the carrier leak canceller 1017 (see FIG. 9).

Therefore, when it takes much time to perform slight delay detecting processing, the speed at which distortion compensation comes into play becomes slow correspondingly. Hence, the number of correlation samples may preferably be made as small as possible. In the present embodiment, as described above, there is provided the error correcting function of allowing the subtracter 1041 to subtract the autocorrelation value detected by the autocorrelation detector 1050 from the cross-correlation value outputted from the slicer 1040 in the cross-correlation detector 1020. It is therefore possible to greatly shorten the time required to detect a slight delay while accuracy is being held.

Incidentally, the autocorrelation detector 1050 has the same configuration as the configuration up to the slicer 1040 in the cross-correlation detector 1020. Therefore, constituent portions that make the same operations and effects in association with the cross-correlation detector 1020 are given the same reference numerals respectively. In the cross-correlation detector 1020, however, the feedback signals RX are inputted to the respective delayers 1021 through 1023 and the inputs of the respective multipliers 1024 through 1026 are set as the transmit signals TC outputted from the slight delay generation LPF 1080 in order to detect the correlation value between the feedback signals RX and the transmit signals TX. On the other hand, in the autocorrelation detector 1050, the inputs of the respective delayers 1021 through 1023 and the respective multipliers 1024 through 1026 are both set as the feedback signals RX in order to detect autocorrelation value of the feedback signals RX. The operation of the autocorrelation detector 1050 is similar to that of the cross-correlation detector 1020. Thus, the description of the operation of the autocorrelation detector 1050 is omitted.

When the averaged cross-correlation value difference $S_N$ is obtained at the cross-correlation detector 1020 in the above-described manner, the delay detection controller 1060 takes the averaged cross-correlation value difference $S_N$ therein, and controls the LPF tap coefficient selector 1070 to change the tap coefficient of the slight delay generation LPF 1080, thereby changing the delay amount of the transmit signals TX by ±Ts/M (corresponding to the time of 1/M of one sample time interval) according to the sign of the cross-correlation value difference $S_N$. And the cross-correlation detector 1020 resumes the above operation using the transmit signals TX delayed by a new delay amount.

Figure 13:
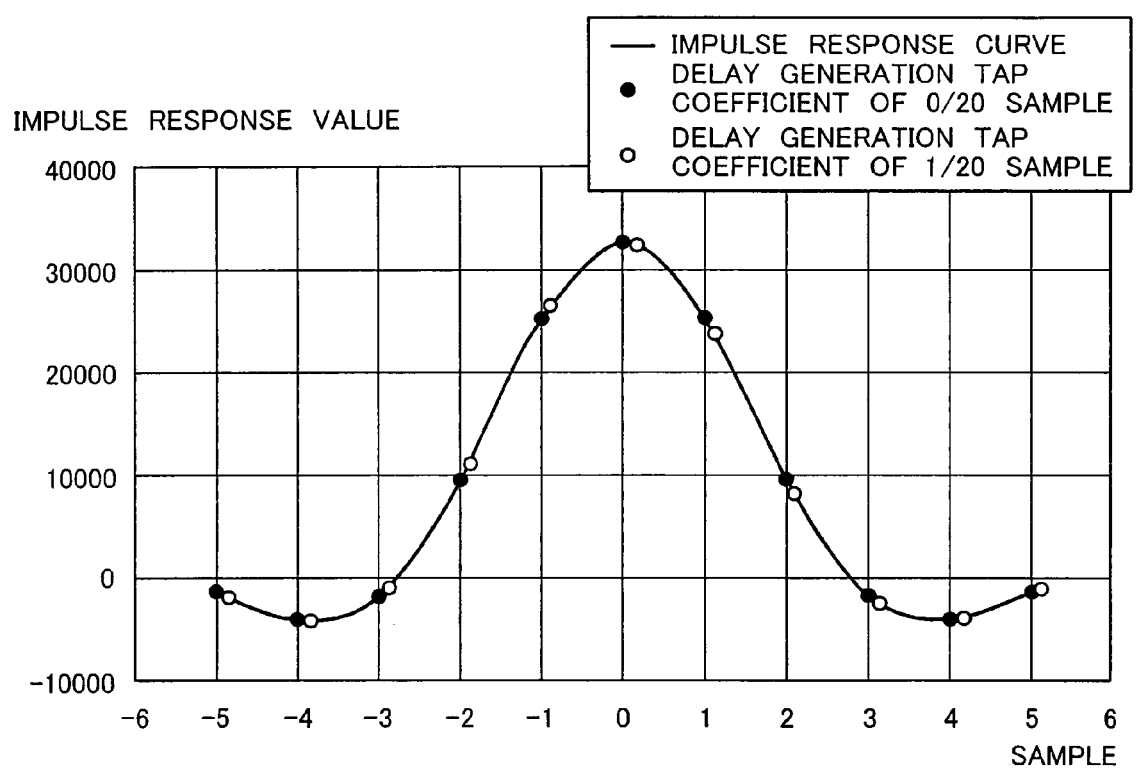
FIG. 13 is a characteristic diagram showing an impulse response of a delay generating LPF shown in FIG. 12.

FIG. 13 is a characteristic diagram showing an impulse response of the slight delay generation LPF 1080 shown in FIG. 12.

In the same drawing, the LPF 1080 is configured as an FIR filter having the number of taps L=11, which operates in one sample cycle. In this case, marks ● indicate impulse response values at sample intervals at the time that tap coefficients with no generation of delay where no delay exists are set. On the other hand, when tap coefficients are set so as to cause a delay of a 1/20 sample time, for example, such a characteristic that impulse response values set at sample intervals, which are indicated by marks ○, is set to the LPF 1080. The response characteristic indicated by the marks ○ is delayed by the 1/20 sample time interval than a response characteristic indicated by the marks ●. Thus, the signals that pass through the slight delay generation LPF 1080 are delayed by the 1/20 sample time interval.

The LPF tap coefficient selector 1070 reads impulse responses with offsets corresponding to N and at intervals of M from an unillustrated ROM storing impulse responses (tap coefficients) of M-times oversamples with M=20, and sets the same to the slight delay generation LPF 1080.

The delay detection controller 1060 stores the value of the present N therein and fetches in a cross-correlation value difference $S_N$ based on the value of N. When the cross-correlation value difference $S_N$ is positive, the delay detection controller 1060 decrements N by −1. When the cross-correlation value difference $S_N$ is negative, the delay detection controller 1060 increments N by +1 to make a new N and outputs it to the LPF tap coefficient selector 1070. If N is likely to exceed M−1 at this time, then the delay detection controller 1060 may increment $\Delta A_P$ by 1 and subtract M from N. If N is likely to fall below −(M−1) in reverse, then the delay detection controller 1060 may decrement $\Delta A_P$ by 1 and add M to N.

The transmit signals TX and feedback signals RX made coincident in timing in this way are supplied to the distortion detector in FIG. 8, where they are processed by comparison to detect distortion components. Such a characteristic that distortion is cancelled by the DPD 1011, and such a characteristic that a carrier leak is cancelled by the carrier leak canceller 1017 are set according to the detected distortion components.

Thus, in the present embodiment, the coarse delay amounts set in one sample time interval unit, of the transmit signals TX and the feedback signals RX, and the slight delay amounts thereof set in time interval units within one sample time interval are detected. The shift in timing between each of the transmit signals TX and each of the feedback signals RX is corrected based on these coarse delay amounts and slight delay amounts. It is therefore possible to perform matching in timing between the transmit signals TX and the feedback signals RX with a high degree of precision. Accordingly, the distortion of the feedback signals RX, which is generated at the power amplifier 1004, can be detected with a high degree of precision.

Assuming that, as one example, a sample frequency is defined as 92.16 MHz, for example and a slight delay amount is detected with an accuracy (M=20 in this case) of a 1/20 sample time unit, the time interval Ts of one sample results in 1/92.16 μsec=approximately 10 nsec, and the slight delay amount equivalent to 1/20 of the coarse delay amount is detected. Therefore, when the distortion of the feedback signals RX is detected, the shift in timing between each of the transmit signals TX and each of the feedback signals RX can be suppressed to within about 10 nsec÷20=about 0.5 nsec.

Figure 14A:
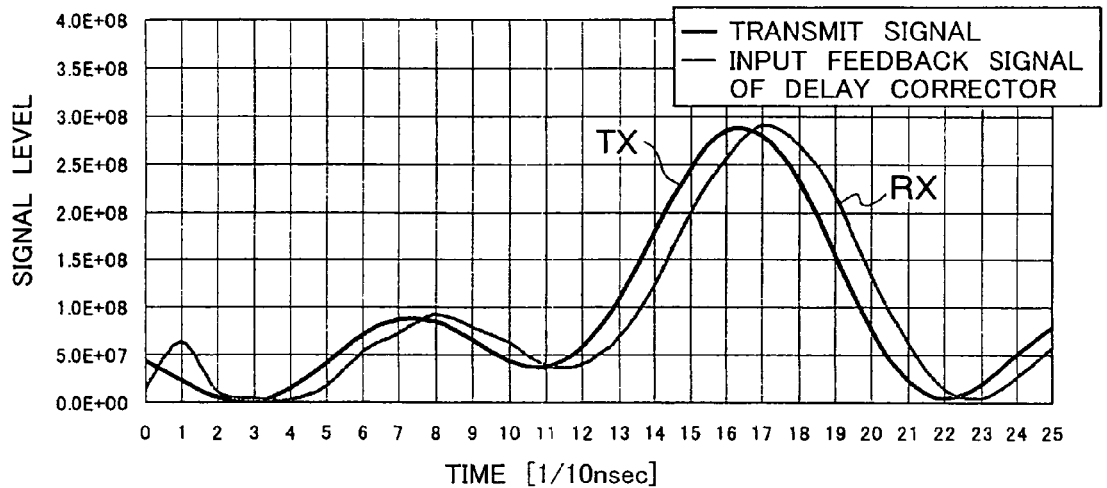
FIG. 14 is a diagram showing, by comparison, waveforms of transmit signals TX and feedback signals RX prior and subsequent to slight delay correction by the coarse delay detection/correction section shown in FIG. 12.
Figure 14B:
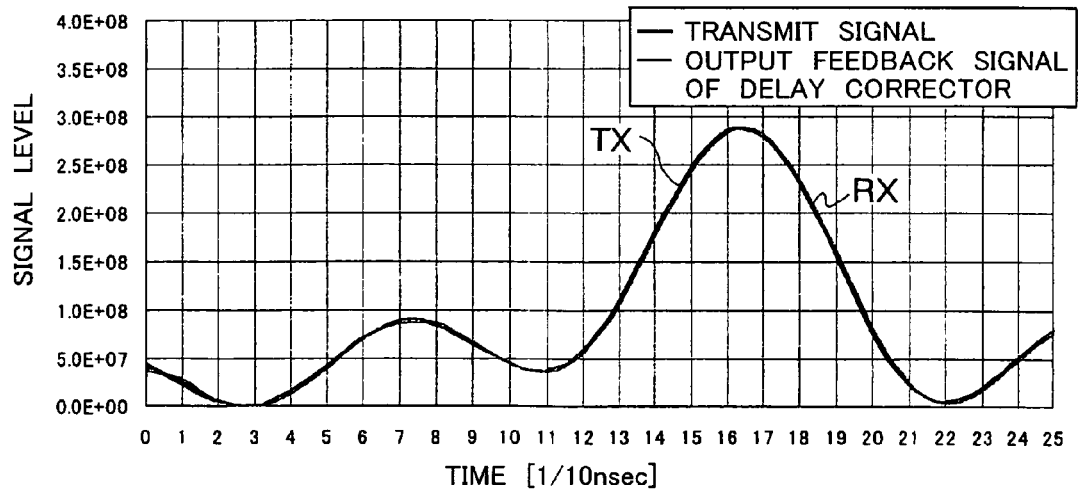

FIG. 14 shows waveforms of transmit signals TX and feedback signals RX by comparison. The horizontal axis indicates a time axis and the vertical axis indicates a signal level, respectively. The same figure (a) shows waveforms of a transmit signal TX and a feedback signal RX prior to delay correction, and the same figure (b) shows waveforms of a transmit signal TX and a feedback signal RX subsequent to delay correction, which have been delay-corrected by the above embodiment, respectively.

In FIG. 14(*a*), the feedback signal RX is delayed about 7.5 nsec lying within one sample time interval (about 10 nsec) with respect to the transmit signal TX. A power waveform of the feedback signal RX is also delayed about 7.5 nsec with respect to that of the transmit signal TX.

On the other hand, the delay of about 7.5 nsec almost disappear as shown in FIG. 14(*b*) as a result of execution of the slight delay detection correcting process described in FIG. 12. The power waveforms of the transmit signals TX and feedback signals RX approximately overlap each other and hence the slight delay can be corrected.

While the preferred forms of the present invention have been described, it is to be understood that modifications will be apparent to those skilled in the art without departing from the spirit of the invention. The scope of the invention is to be determined solely by the following claims.

What is claimed is:
1. A transmitter with a delay correcting function, including a digital modulator which digital-modulates a plurality of input baseband signals and outputs signals of I and Q phases, a D/A converter which converts the signals of I and Q phases outputted from said digital modulator to analog signals, a frequency converter which quadrature-modulates the analog signals of I and Q phases outputted from said D/A converter and upconverts the same into signals lying in an RF band, and a power amplifier which power-amplifies output signals of said frequency converter, said transmitter performing transmission of plural channels, said transmitter comprising:
 a mixer which downconverts the output signals of said power amplifier;
 and A/D converter which converts the output signals of said mixer into digital signals;
 a digital quadrature detector which quadrature-detects the output signals of said A/D converter to output signals of I and Q phases;
 a delay detector which supplies the signals of I and Q phases outputted from said digital modulator as transmit signals and supplies the signals of I and Q phases outputted from said digital quadrature detector as feedback signals, respectively, and which detects, as shifts in timing between the transmit signals and the feedback signals, a coarse delay amount with an accuracy of a sample time unit for each of the transmit signals and feedback signals and a slight delay amount with an accuracy of a time unit shorter than the sample time unit for each of both signals; and
 a delay corrector which corrects shifts in timing between the transmit signals and the feedback signals on the basis of the coarse delay amount and the slight delay amount detected by said delay detector.

* * * * *